United States Patent
Nakata et al.

(10) Patent No.: US 6,798,832 B1
(45) Date of Patent: Sep. 28, 2004

(54) SEMICONDUCTOR DEVICE WITH DECISION FEEDBACK EQUALIZER

(75) Inventors: Yoshitaka Nakata, Kasugai (JP); Masaru Sawada, Kasugai (JP); Tsunehiko Moriuchi, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/536,184

(22) Filed: Mar. 27, 2000

(30) Foreign Application Priority Data

Aug. 6, 1999 (JP) .............................................. 11-223838
Sep. 9, 1999 (JP) .............................................. 11-256161

(51) Int. Cl.[7] .................................................. H04H 7/40
(52) U.S. Cl. ........................ 375/233; 375/317; 375/350; 708/323
(58) Field of Search ................................ 375/214, 216, 375/229, 230, 232, 233, 236, 262, 350, 317; 708/300, 322, 323; 329/350, 353

(56) References Cited

U.S. PATENT DOCUMENTS

| | | | | |
|---|---|---|---|---|
| 5,654,765 A | * | 8/1997 | Kim ............................ | 348/614 |
| 5,835,532 A | * | 11/1998 | Strolle et al. ................ | 375/233 |
| 6,002,713 A | * | 12/1999 | Goldstein et al. ............ | 375/222 |
| 6,052,349 A | * | 4/2000 | Okamoto .................. | 369/47.26 |
| 6,130,793 A | * | 10/2000 | Ohmori et al. ................ | 360/53 |
| 6,141,167 A | * | 10/2000 | Nishida et al. ................ | 360/65 |
| 6,201,832 B1 | * | 3/2001 | Choi ........................... | 375/233 |
| 6,289,063 B1 | * | 9/2001 | Duxbury ..................... | 375/348 |
| 6,381,271 B1 | * | 4/2002 | Javerbring ................... | 375/233 |
| 6,505,222 B1 | * | 1/2003 | Davis et al. ................. | 708/323 |

* cited by examiner

*Primary Examiner*—Stephen Chin
*Assistant Examiner*—Dac V. Ha
(74) *Attorney, Agent, or Firm*—Greer, Burns & Crain, Ltd.

(57) ABSTRACT

A semiconductor circuit includes a decision feedback equalizer (DFE) for waveform-equalizing an input signal and generating a waveform-equalized input signal. The DFE compares the waveform-equalized signal with a predetermined reference voltage to generate a decision signal having first and second decision values and an error signal which lies between the waveform-equalized signal and the decision signal. A dispersion value calculator is connected to the DFE, calculates first and second dispersion values of the first and second decision values of the decision signal using the error signal, and produces a compensation signal using the first and second dispersion values. An asymmetry compensator is connected to the DFE and the dispersion value calculator. The asymmetry compensator receives the input signal and corrects an asymmetry in the input signal in accordance with the compensation signal and supplies the corrected input signal to the DFE. The semiconductor device may be used in a hard disk control circuit.

14 Claims, 20 Drawing Sheets

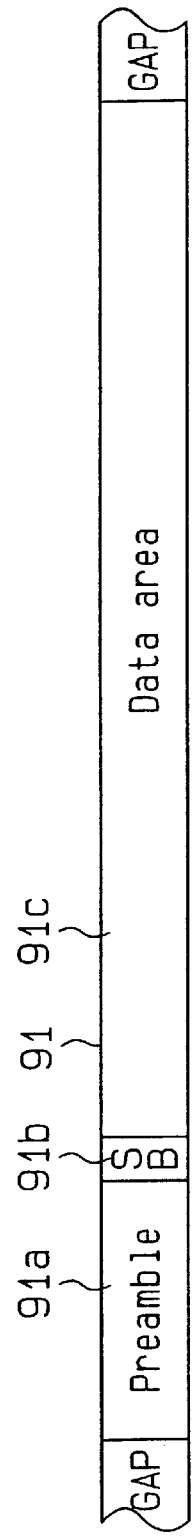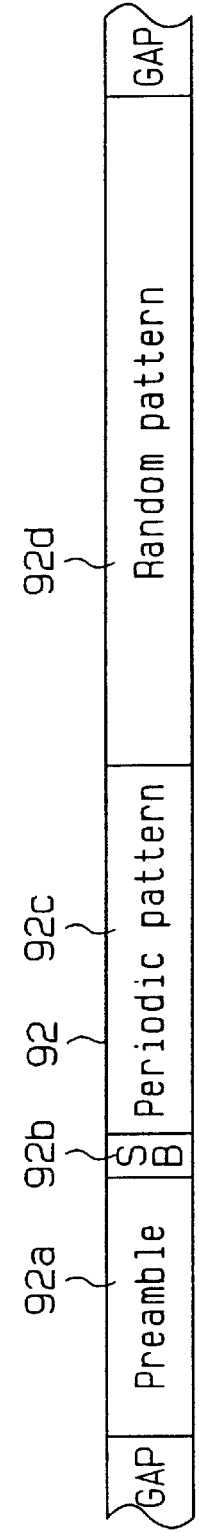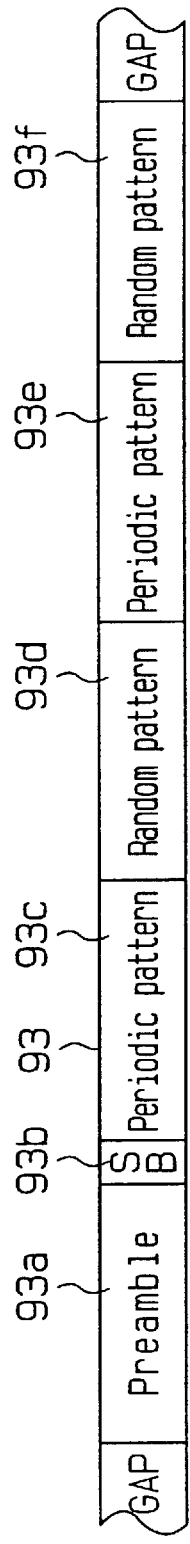

SEMICONDUCTOR DEVICE WITH DECISION FEEDBACK EQUALIZER

BACKGROUND OF THE INVENTION

The present invention relates to a semiconductor device, and, more particularly, to a semiconductor device (read channel LSI) in a digital magnetic storage device, which demodulates and decodes a read signal from a read head using a decision feedback equalizer or a semiconductor device in a base band transmission device, which demodulates and decodes a received signal.

A hard disk device has a read channel IC including an A/D (Analog-to-Digital) converter, which converts an analog signal read from a hard disk by a read head to a digital signal, and an equalizer which decodes the digital signal, generating a decoded digital signal.

As the recording density of data and the read speed increase, there is more interest in a decision feedback equalizer (DFE) than a PRML (Partial Response and Maximum-Likelihood detection) type waveform equalizer. The PRML type waveform equalizer needs a high-precision digital filter and equalizer filter, which prevent increasing the processing speed and circuit miniaturization. On the other hand, the DFE has a relatively simple circuit structure, and thus provides a preferable way to improve the reading speed and miniaturization.

As shown in FIG. 1, the read head provides a reproduced waveform which has a voltage corresponding to change in a magnetic field on a recording medium. When the bias point of the reproduced waveform is shifted due to some disturbance factor, a reproduced waveform having a vertical asymmetry, shown by the broken line in FIG. 3, is formed. When the reproduced waveform has an asymmetry, its electromagnetic conversion characteristic is represented by an approximation curve as shown in FIG. 2. In FIG. 2, the straight line indicates the input/output waveform characteristic of an ideal reproduced waveform.

The asymmetry of the reproduced waveform from the head and the insufficient characteristic adjusting performance of the equalizer produce a deformation in the equalized waveform generated by the DFE. This deformation is detected as the difference between a target equalized waveform and the actual equalized waveform.

The asymmetry of the reproduced waveform also leads to an error in a decision made by the equalizer, thereby increasing the bit error rate of decoded signals. To cope with this shortcoming, a conventional read channel LSI corrects the asymmetry of the reproduced waveform using the following schemes.

Scheme 1: A digital signal output from the A/D converter is divided into two components with respect to a base line of a predetermined level (e.g., the zero level) and correction values are added to the two divided digital signals.

Scheme 2: The input amplitude is divided into a predetermined number of sub-amplitudes and correction values set for the respective sub-amplitudes are added to the digital signal while approximating the input/output characteristic curve in each sub-amplitude using polygonal lines.

These schemes are carried out by measuring the bit error rate of an output signal (disk read data) with respect to an input signal (disk write data) and adjusting the characteristic of the equalizer based on the measuring result. As it is necessary to repeatedly measure the bit error rate and adjust the characteristic of the equalizer, the adjusting takes a considerable amount of time.

Scheme 1 corrects only the peak value of a reproduced waveform, so its correcting effect is small. Because correction values are preset in the scheme 2, this scheme cannot cope with a change in input signal.

Japanese Unexamined Patent Publication (KOKAI) No. Hei 10-83626 discloses a DFE which comprises a forward equalizer (forward filter), an adder, a code detector (decision unit) and a back equalizer (feedback filter). Each of the forward equalizer and back equalizer includes an FIR (Finite Impulse Response) filter, and the characteristics of both equalizers or coefficients are automatically adjusted based on the detection result (reproduction state) from the code detector. This structure reduces reproduction errors caused by noise from a head unit (MR head) having a manufacturing error or an asymmetric characteristic. That is, this structure suppresses reproduction errors which are produced by factors, such as use conditions, manufacturing variations and time-dependent changes.

The forward filter and feedback filter have a close correlation. Specifically, the coefficient of the feedback filter is determined by the characteristic of the forward filter. To change the coefficient of the forward filter, therefore, the coefficient of the feedback filter should be changed too. Arithmetic circuits are used to alter the coefficients of both the forward filter and feedback filter. The number of arithmetic circuits provided should be equal to the number of taps of each equalizer. As the number of taps increases, the number of the arithmetic circuits also increases, making the circuit area of the DFE larger.

If the gains of both the forward filter and feedback filter are increased to quickly converge the coefficients of both filters to the optimal coefficients, the feedback loop becomes unstable. Adaptive equalization of the forward filter and feedback filter, by way of contrast, stabilizes the feedback loop but takes time for the coefficients to converge. To improve the precision of the forward filter, it is desirable to increase the number of forward filters. Because the increase in the number of forward filters enhances the gain of the forward filter, it is necessary to cope with an abrupt change in filter output.

Further, the maximum likelihood decoder that is used in the PRML system involves soft decision, whereas the DFE involves hard decision. This requires that the gain of the DFE be enhanced to suppress decision errors. When an unexpected deformation is superimposed on the input signal of the DFE, therefore, the number of equalization errors increases, making the adaptive equalization difficult. As apparent from the above, the DFE involves a difficult adjustment to make the coefficients converge and takes a significant time to optimize the adjustment of the coefficients.

There is a variation in the analog front end characteristic of the DFE on the input side. To optimize the filter coefficients in accordance with this variation, the DFE performs coefficient training. Because the training work is performed on the forward filter and the feedback filter, it takes time and effort.

SUMMARY OF THE INVENTION

Accordingly, it is a first object of the present invention to provide a semiconductor device or circuit which corrects the asymmetry of a reproduced waveform with high precision.

It is a second object of this invention to provide a semiconductor device or circuit having a decision feedback equalizer whose characteristic is easily adjusted.

In one aspect of the present invention, a semiconductor circuit is provided that includes a decision feedback equalizer for waveform-equalizing a corrected input signal and generating a waveform-equalized signal. The equalizer compares the waveform-equalized signal with a predetermined reference level to generate a decision signal having first and second decision values and an error signal between the waveform-equalized signal and the decision signal. A dispersion-value calculator is connected to the decision feedback equalizer, calculates a first dispersion value of the decision signal having the first decision value and a second dispersion value of the decision signal having the second decision value using the error signal, and produces a compensation signal using the first and second dispersion values. An asymmetry compensator is connected to the decision feedback equalizer and the dispersion-value calculator, receives an input signal and correcting an asymmetry of the input signal in accordance with the compensation signal and supplies the corrected input signal to the decision feedback equalizer.

In another aspect of the present invention, a semiconductor circuit is provided that includes an analog-to-digital (A/D) converter for converting an analog input signal to a digital input signal with an intermediate reference voltage as a base line. A decision feedback equalizer waveform-equalizes a corrected digital input signal and generates a waveform-equalized signal. The equalizer compares the waveform-equalized signal with a predetermined reference level and produces a decision signal having first and second decision values and an error signal between the waveform-equalized signal and the decision signal. A dispersion-value calculator is connected to the decision feedback equalizer, calculates a first dispersion value of the decision signal having the first decision value and a second dispersion value of the decision signal having the second decision value using the error signal and produces a compensation signal using the first and second dispersion values. An asymmetry compensator is connected between the decision feedback equalizer and the A/D converter, receives the compensation signal from the dispersion-value calculator, corrects an asymmetry of the digital input signal using the compensation signal and supplies the corrected digital input signal to the decision feedback equalizer. A base-line compensation detector is connected to the decision feedback equalizer and computes a base-line compensation value using the waveform-equalized signal. A digital-to-analog (D/A) converter is connected to the base-line compensation detector and the A/D converter, produces the intermediate reference voltage in accordance with the base-line compensation value and supplies the intermediate reference voltage to the A/D converter.

In yet another aspect of the present invention, a semiconductor circuit is provided that includes a finite impulse response (FIR) equalizer for equalizing a waveform of a digital signal to produce an equalized digital signal. A decision feedback equalizer is connected to the FIR equalizer and compares the equalized digital signal with a predetermined reference level to produce a decision signal.

In another aspect of the present invention, a decision feedback equalizer is provided that includes a finite impulse response (FIR) equalizer for equalizing a waveform of a digital signal to produce an equalized digital signal. A forward filter is connected to the FIR equalizer and filters the equalized digital signal using a first coefficient to produce a filtered digital signal. An adder is connected to the forward filter and adds the filtered digital signal and a feedback signal to produce an added signal. A decision circuit is connected to the adder and compares the added signal with a predetermined reference level to produce a decision signal. A feedback filter is connected to the decision circuit and the adder, filters the decision signal using a second coefficient to produce the feedback signal and supplies the feedback signal to the adder.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 13A through 13C are explanatory diagrams of a hard disk sector format;

DETAILED DESCRIPTION OF THE PREFERRED EMBODIMENTS

Figure 1:
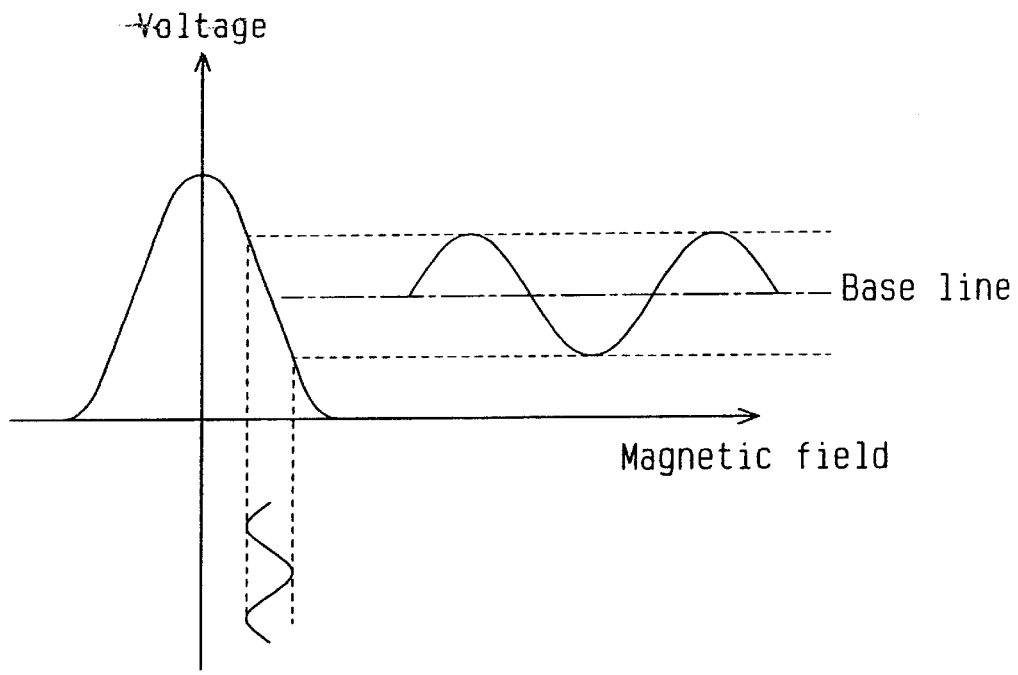
FIG. 1 is an electromagnetic conversion characteristic diagram showing the relationship between a magnetic field and the output voltage of a head.
Figure 2:
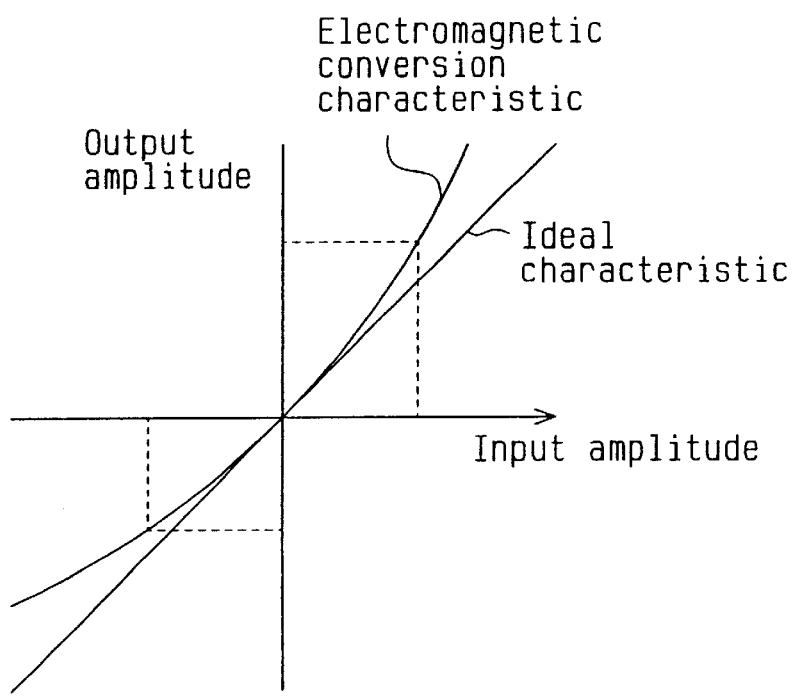
FIG. 2 is a graph showing the relationship between an input amplitude and an output amplitude.
Figure 3:
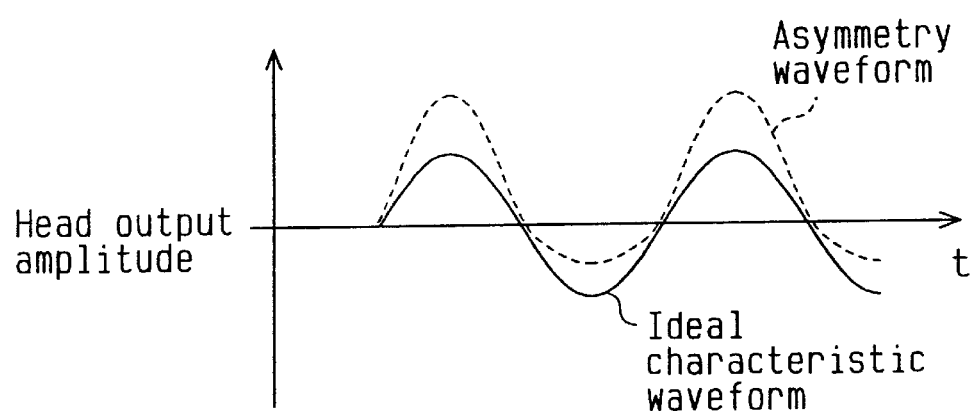
FIG. 3 is a waveform diagram of a read data signal.

In the drawings, like numerals are used for like elements throughout.

First Embodiment

Figure 4:
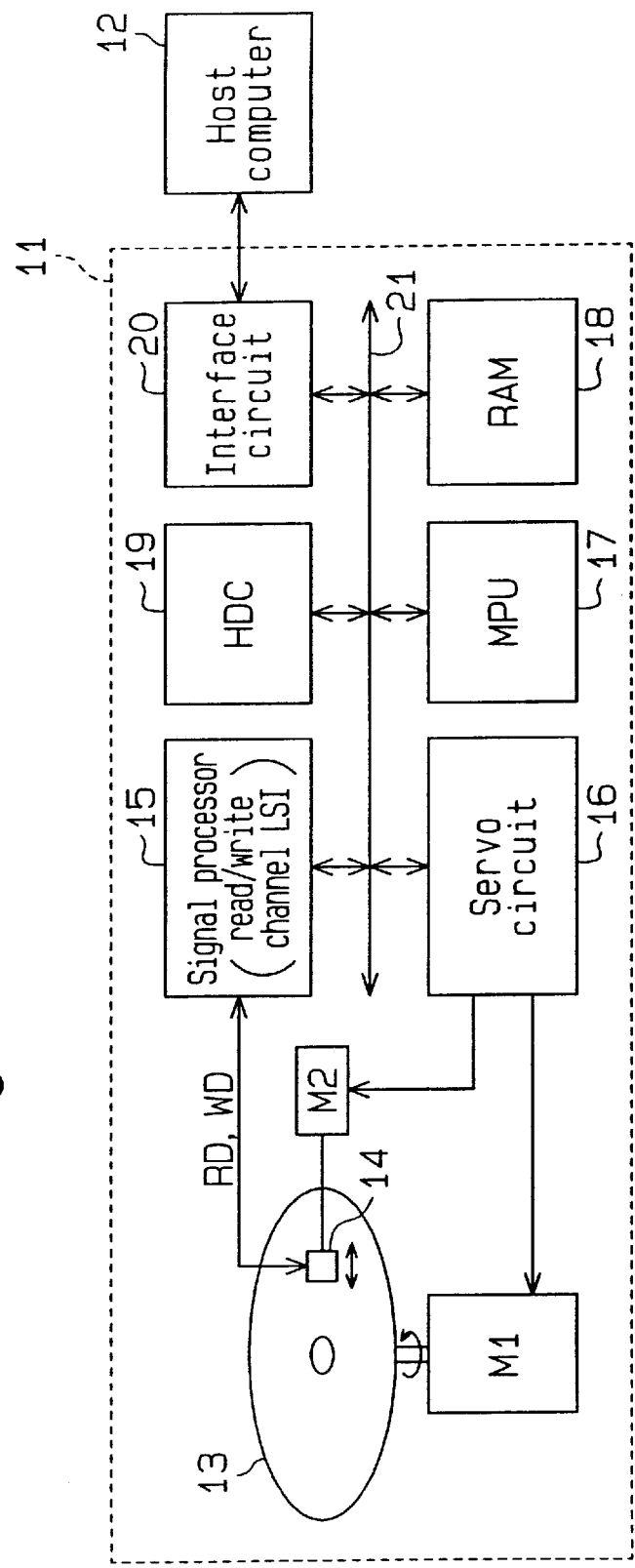
FIG. 4 is a schematic block diagram of a hard disk device according to a first embodiment of the present invention.

FIG. 4 is a schematic block diagram of a hard disk device 11 according to a first embodiment of the present invention. This hard disk device 11 receives data from a host computer 12 and records the data on a magnetic disk 13 in response to a write request from the host computer 12. The hard disk device 11 reads data from the magnetic disk 13 and supplies the data to the host computer 12 in response to a read request.

The hard disk device 11 comprises the magnetic disk 13, first and second motors M1 and M2, a head unit 14, a read channel LSI or signal processor 15, a servo circuit 16, a microprocessor unit (MPU) 17, a memory (RAM) 18, a hard disk controller (HDC) 19 and an interface circuit 20, all connected to a bus 21.

The magnetic disk 13 is rotated at a constant velocity by the first motor M1. The head unit 14 is controlled by the second motor M2 so as to be movable in the radial direction of the magnetic disk 13. The head unit 14 includes a write head and a read head such as magneto resistive (MR) heads. The head unit 14 forms magnetic poles on the magnetic disk 13 in response to a write signal WD from the signal processor 15 and produces a read signal RD having a voltage corresponding to changes in magnetic poles on the magnetic disk 13 in response to a read command from the signal processor 15.

The signal processor (read/write channel LSI) 15 converts the read signal RD to a digital signal by sampling the read signal RD according to a sampling clock which is synchronous with the read signal RD. The signal processor 15 decodes the digital signal and generates decoded data.

The servo circuit 16 controls the first motor M1 for rotating the magnetic disk 13 at a constant velocity. The servo circuit 16 receives the decoded data from the signal processor 15 and controls the second motor M2 for tracking a target track in accordance with servo information included in that decoded data.

The MPU 17 analyzes commands for a write/read process, etc. from the host computer 12 in accordance with a program stored in the RAM 18, and outputs control signals. The HDC 19 receives the control signals from the MPU 17, and controls the signal processor 15 and the servo circuit 16. The HDC 19 also receives a digital signal from the signal processor 15 and generates sector data which comprises a predetermined number of bytes sector by sector. The HDC 19 further performs, preferably, ECC (Error Correcting Code) based error correction sector by sector, and supplies error-corrected data to the interface circuit 20 via the bus 21. The interface circuit 20 converts the output data of the HDC 19 to data according to a predetermined communication system, and supplies read data to the host computer 12.

The HDC 19 receives write data from the host computer 12 via the interface circuit 20 and affixes the error-correction code to the write data. The signal processor 15 writes the output data of the HDC 19 on the magnetic disk 13 via the head unit 14.

Figure 5:
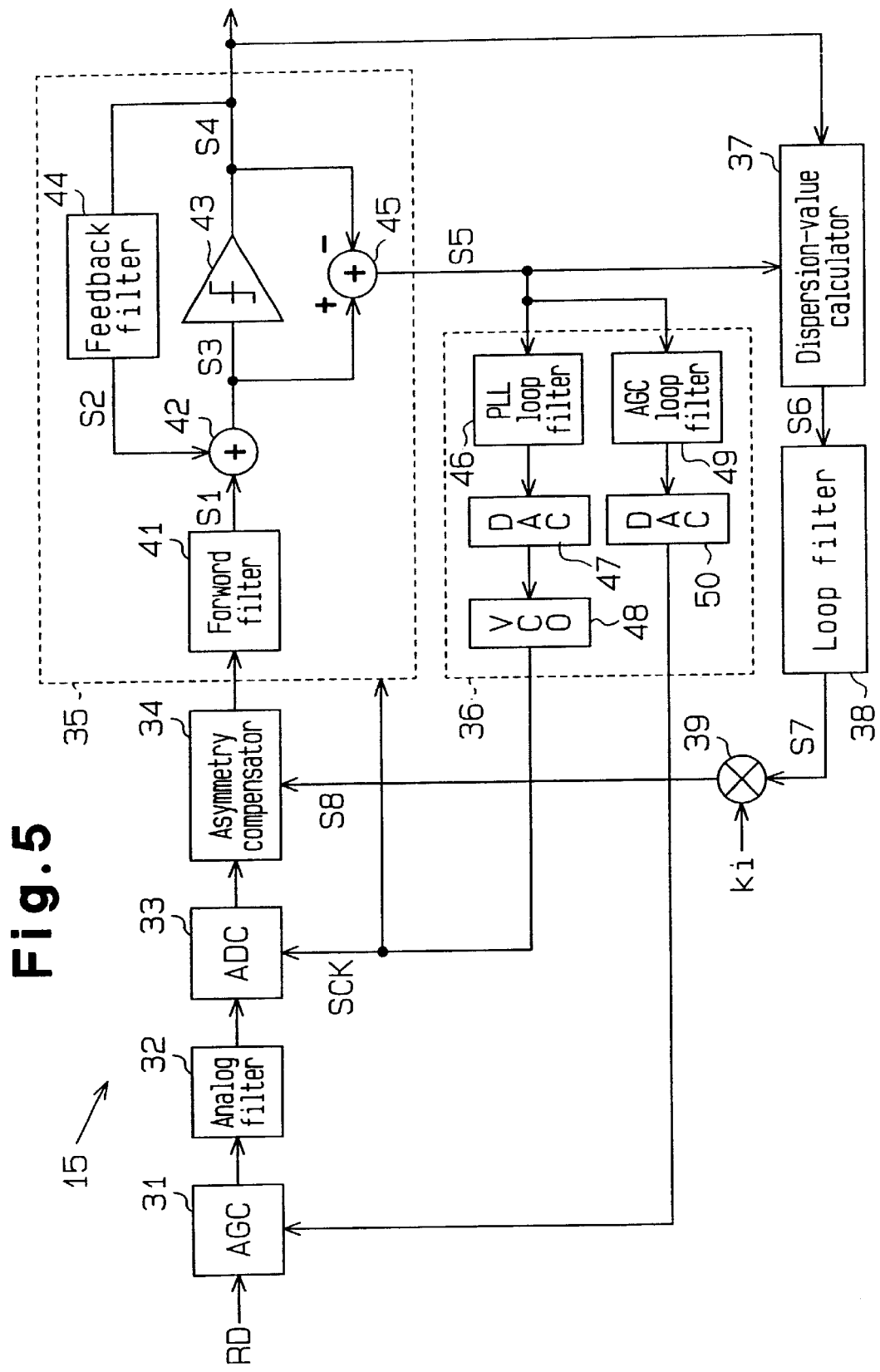
FIG. 5 is a schematic block diagram of a read channel LSI of the hard disk device of FIG. 4.

FIG. 5 is a schematic block diagram of the signal processor 15. Next, the read data demodulating/decoding section of the signal processor 15 will be explained. The signal processor 15 includes an auto gain control amplifier (AGC) 31, an analog filter 32, an analog-to-digital converter (ADC) 33, an asymmetry compensator 34, a DFE 35, a loop control circuit 36, a dispersion-value calculator 37, a loop filter 38 and a multiplier 39.

The AGC 31 amplifies a read signal RD from the head unit and sends the amplified read signal to the analog filter 32. The AGC 31 controls its own amplification factor according to a control voltage output from the loop control circuit 36.

The analog filter 32 filters the amplified read signal from the AGC 31 and provides the ADC 33 with a filtered read signal having the proper frequency characteristic for demodulation and decoding.

The ADC 33 samples the filtered read signal from the analog filter 32 in accordance with a sampling clock signal SCK supplied from the loop control circuit 36 and converts the filtered read signal to a digital read signal.

The asymmetry compensator 34 receives the digital read signal from the ADC 33 and corrects the asymmetry of the digital read signal in accordance with compensation information. The compensation information includes a compensation value for segmenting the range of the digital read signal into a plurality of sub-ranges and changing the conversion gain of the digital read signal sub-range by sub-range. The asymmetry compensator 34 produces new or updated compensation information based on the result of the computation in the dispersion-value calculator 37, and stores the updated compensation information.

Figure 9A:
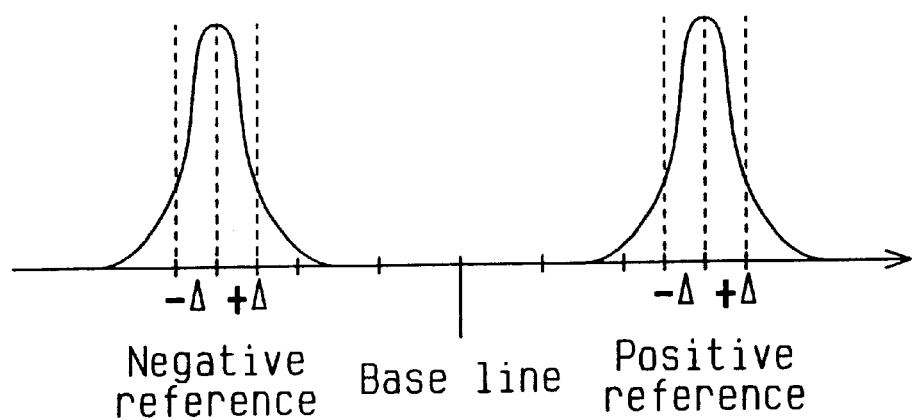
FIGS. 9A and 9B are histograms showing dispersion of the amplitude of a reproduced waveform acquired using a reference level.
Figure 9B:
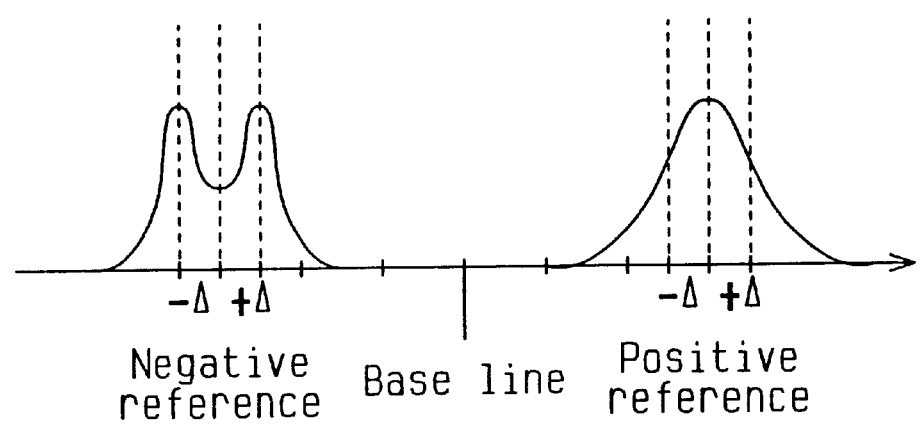

Specifically, the asymmetry of the reproduced waveform of the read signal from the head unit 14 increases as the amplitude of the read signal increases. The dispersions of the amplitude value of the reproduced waveform vary at the time an equalized waveform is produced using positive and negative reference levels of a decision circuit 43 of the DFE 35. When the reproduced waveform has little asymmetry, as shown in FIG. 9A, the two dispersions of the amplitude value of the reproduced waveform acquired by using the positive and negative reference levels take the form of a normal distribution. When the reproduced waveform has an asymmetry as shown in FIG. 9B, however, the two dispersions of the amplitude value of the reproduced waveform do not take the form of a normal distribution. The dispersion-value calculator 37 computes the difference between the two dispersions and the asymmetry compensator 34 determines the compensation value for the conversion gain of the digital read signal based on that difference in such a way that the positive and negative dispersions become uniform. The asymmetry compensator 34 also determines the compensation value in a direction from a sub-range near zero (base line) toward a sub-range in which the amplitude gradually increases. Accordingly, the compensation value is determined in accordance with the characteristic of the read signal (the characteristic of the head unit 14) whose asymmetry increases as the amplitude gradually increases.

The asymmetry compensator 34 uses the determined compensation value for the sub-range as the initial value for determining a compensation value for the next sub-range. Suppose each of the positive and negative ranges of the read signal is divided into three sub-ranges from one near zero to one with a maximum amplitude value. The asymmetry compensator 34 uses the compensation value that has been determined for the first positive sub-range as the initial value for determining a compensation value for the second sub-range. This is because the voltage of the read signal continuously changes over the individual sub-ranges. The use of the compensation value determined for the sub-range near zero as the initial value decreases the time needed for determining the compensation value and makes the precision of the compensation value higher as compared with the case where the initial value is reset to, for example, zero.

Figure 10:
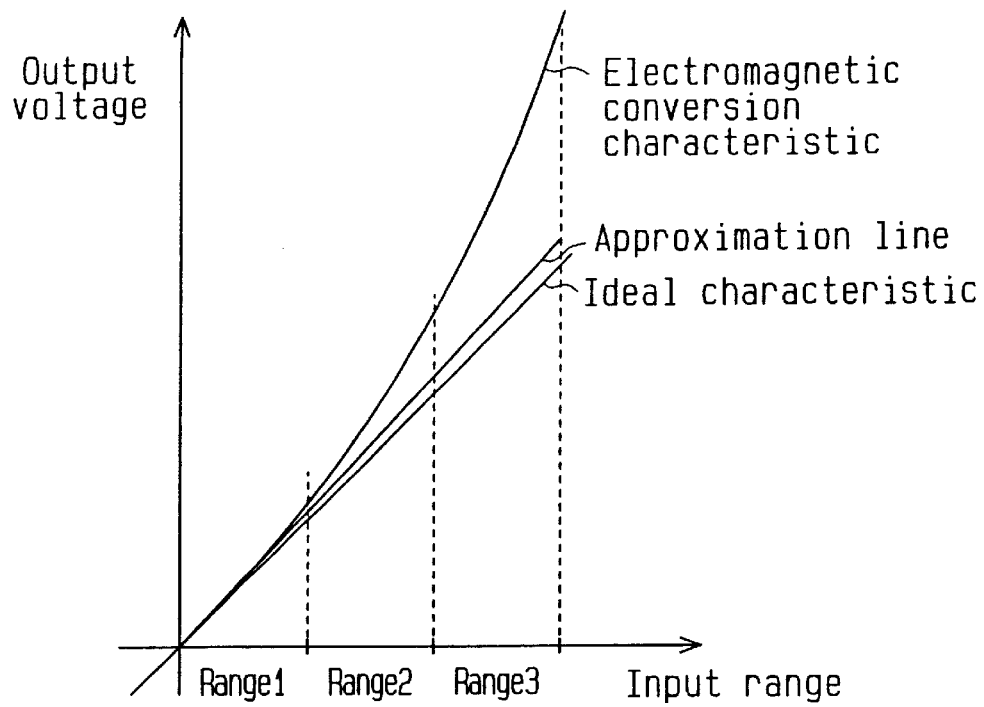
FIGS. 10 through 12 are graphs showing the relationship between the input range of a read signal and the output voltage.
Figure 11:
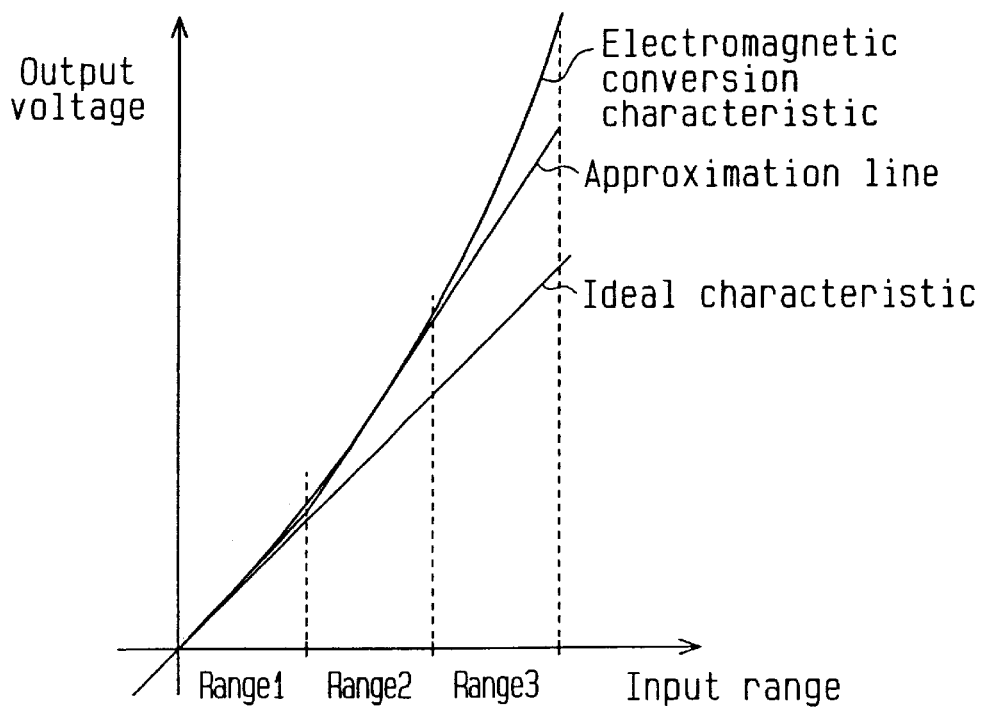
Figure 12:
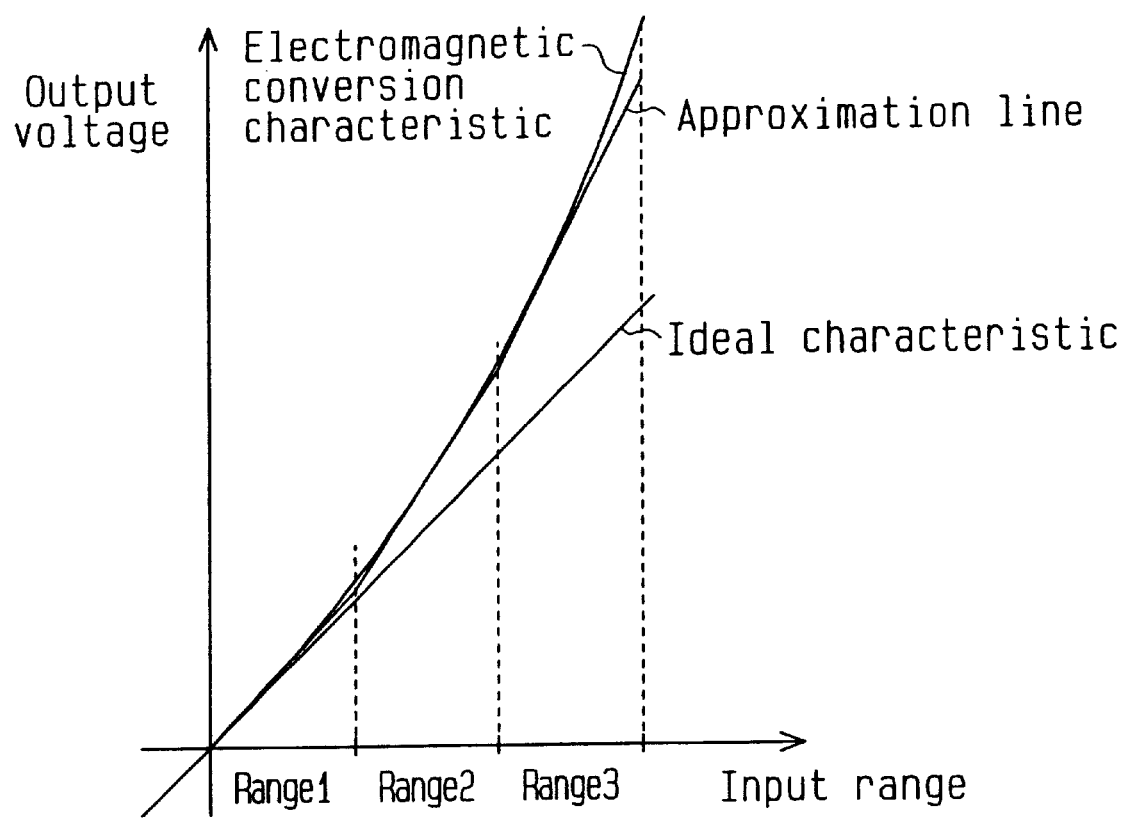

Assume that, the positive range of the read signal is divided into three sub-ranges (range 1, range 2 and range 3) as shown in FIG. 10. First, in range 1, an approximation line for the electromagnetic conversion characteristic is acquired and a compensation value for that approximation line is determined. Next, likewise, in range 2, an approximation line is acquired and a compensation value for that approximation line is determined, as shown in FIG. 11. Then, in range 3, an approximation line is acquired and a compensation value for that approximation line is determined, as shown in FIG. 12. Therefore, the approximation line over ranges 1 to 3, which is formed by polygonal lines, becomes extremely close to the curve of the electromagnetic conversion characteristic. In other words, there is not much difference between the approximation line and the curve of the electromagnetic conversion characteristic. This suppresses correction errors at the time of correcting the electromagnetic conversion characteristic to an idealistic characteristic.

As discussed above, the asymmetry compensator 34 divides the range of the read signal into a plurality of sub-ranges and approximates the curve of the electromagnetic conversion characteristic with polygonal lines in order to determine compensation values in the individual sub-ranges. The asymmetry compensator 34 alters the conversion gain according to the compensation values to correct the asymmetry of the read signal.

The DFE 35 includes a forward filter 41, first adder 42, a decision circuit 43, a feedback filter 44 and a second adder 45.

The forward filter 41 receives a corrected digital read signal from the asymmetry compensator 34 and sends a filtered read signal S1 having the maximum S/N ratio to the adder 42. The adder 42 adds the filtered read signal S1 from the forward filter 41 to a feedback signal S2 coming from the feedback filter 44, thereby producing a waveform-equalized signal S3.

The decision circuit 43 compares the voltage of the waveform-equalized signal S3 with predetermined positive and negative reference voltages and sends a decision signal S4 having a value of either "1" or "0" to the feedback filter 44. The decision signal S4 is sampled in accordance with a sampling clock signal SCK and decision signals corresponding to recorded data are temporarily stored in a shift register (not shown).

The feedback filter 44, which is preferably an FIR filter, eliminates any intersymbol interference included in the decision signal S4 and sends the decision signal S4 free of the intersymbol interference to the adder 42 as the feedback signal S2. The feedback of the decision signal S4 provides a reproduced signal which is free of interference by old bits.

The adder 45 receives the waveform-equalized signal S3 from the adder 42 and the decision signal S4 from the decision circuit 43 and adds both signals S3 and S4 to produce an equalization error signal S5. The equalization error signal S5 is supplied to the loop control circuit 36 and the dispersion-value calculator 37.

The loop control circuit 36 includes a PLL (Phase Locked Loop) filter 46, two digital-to-analog converters (DAC) 47 and 50, a voltage-controlled oscillator (VCO) 48 and an AGC loop filter 49.

The PLL filter 46 filters the error signal S5 and provides the first DAC 47 with a filtered error signal. The DAC 47 converts the filtered error signal to an analog voltage and supplies the analog voltage as a control voltage to the VCO 48. The VCO 48 generates the sampling clock signal SCK having a frequency according to the control voltage, and supplies the sampling clock signal SCK to the ADC 33 and the DFE 35. In this manner, a PLL is formed which optimizes the frequency of the sampling clock signal SCK (sampling timing) based on the phase error between the waveform-equalized signal S3 and the decision signal S4.

The AGC loop filter 49 filters the error signal S5 and provides the second DAC 50 with a filtered error signal. The DAC 50 converts the filtered error signal to an analog voltage and supplies the analog voltage as a control voltage to the AGC 31. The AGC 31 adjusts its own gain in accordance with the control voltage. In this manner, an AGC loop is formed which optimizes the gain of the AGC 31 (the amplitude of the amplified read signal) based on the amplitude error between the waveform-equalized signal S3 and the decision signal S4.

The dispersion-value calculator 37 receives the decision signal S4 from the decision circuit 43 and the equalization error signal S5 from the adder 45, computes the amplitude value dispersion at an equalization target level using the signals S4 and S5 and produces an amplitude dispersion signal S6.

Specifically, the dispersion-value calculator 37 squares the error signal S5, multiplies the square of the error signal S5 corresponding to the decision signal S4 having a decision result "1" (positive) by a predetermined number (e.g., 100 samples) and multiplies the square of the error signal S5 corresponding to the decision signal S4 having a decision result "0" (negative) by the predetermined number. This multiplication provides a dispersion value for the decision result "1" and a dispersion value for the decision result "0". The dispersion-value calculator 37 calculates the difference between the dispersion value for the decision result "1" and the dispersion value for the decision result "0", thereby producing an error compensation signal S6.

The loop filter 38 receives and filters the error compensation signal S6 from the dispersion-value calculator 37, thereby producing a filtered error compensation signal S7 whose frequency characteristic is suitable for the asymmetry compensator 34.

The multiplier 39 multiplies the filtered error compensation signal S7 from the loop filter 38 by a predetermined coefficient ki, producing a coefficient-multiplied error compensation signal S8. The coefficient ki is so set that the value of the filtered error compensation signal S7 of the loop filter 38 becomes smaller in accordance with the individual sub-ranges of the asymmetry compensator 34. This prevents an over-response of the asymmetry compensator 34 from being caused by the filtered error compensation signal S7.

Figure 6:
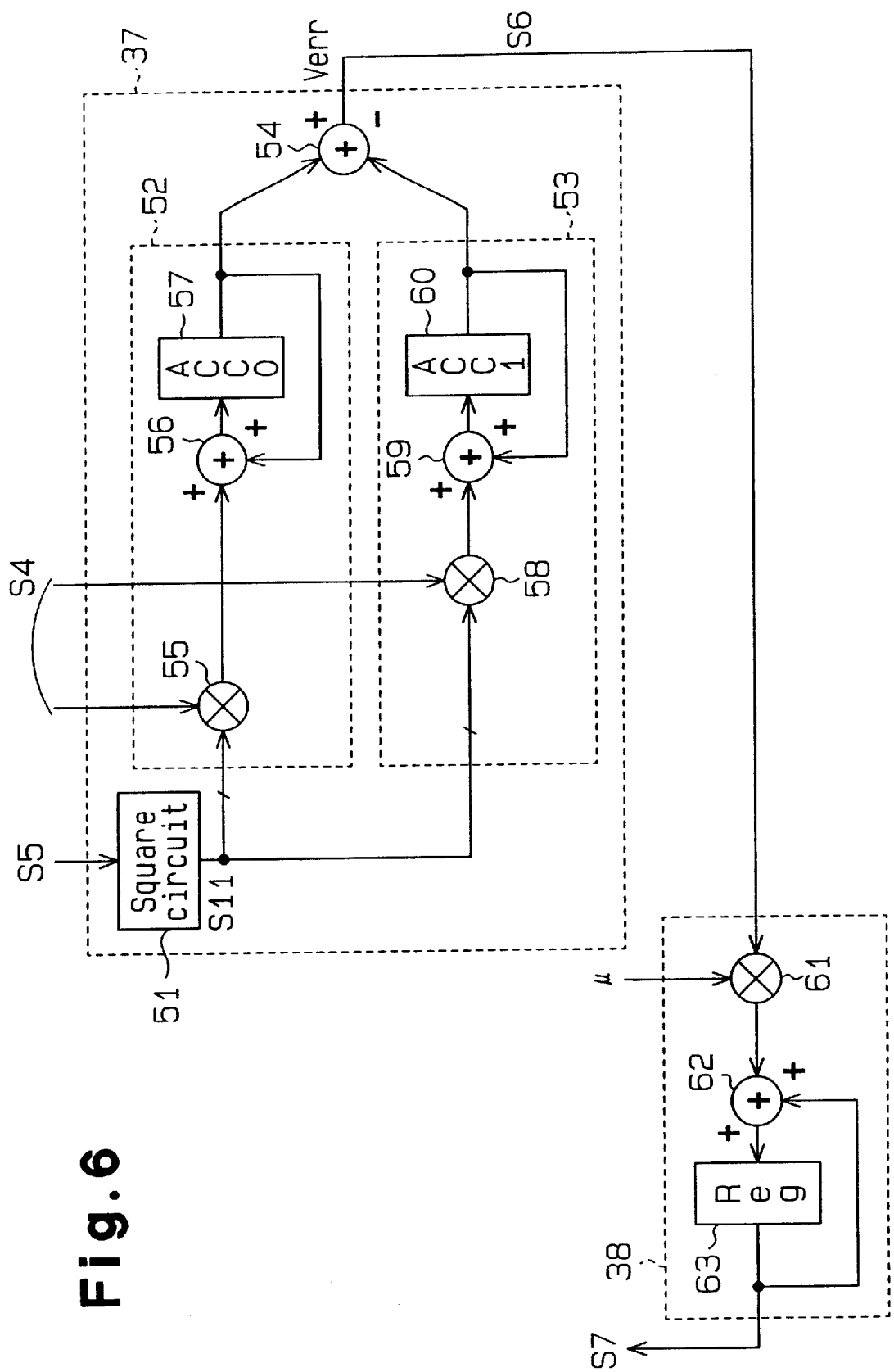
FIG. 6 is a schematic block diagram of a dispersion-value calculator and a loop filter of the read channel LSI of FIG. 5.

FIG. 6 is a schematic block diagram showing the dispersion-value calculator 37 and the loop filter 38. The dispersion-value calculator 37 includes a square circuit 51, first and second dispersion-value calculators 52 and 53 and an adder 54.

The square circuit 51 squares the error signal S5 from the DFE 35 and supplies the first and second dispersion-value calculators 52 and 53 with a square signal S11. In response to the decision signal S4 having the decision result "1" (positive), the first dispersion-value calculator 52 performs multiplication of the square signal S11 to compute a dispersion value. In response to the decision signal S4 having the decision result "0", the second dispersion-value calculator 53 performs multiplication of the square signal S11 to compute a dispersion value.

The first dispersion-value calculator 52 includes a gate circuit 55, an adder 56 and an accumulator (ACC0) 57. The gate circuit 55 supplies the square signal S11 to the adder 56 when the decision signal S4 is "1". The adder 56 adds the square signal S11 and the output signal of the accumulator 57 and provides the accumulator 57 with an added signal. The accumulator 57 sequentially stores the added signal from the adder 56 and produces an average value of the stored added signals. The mean square of the error signal S5 provides the dispersion value of the amplitude of the reproduced waveform for the decision result "1".

The second dispersion-value calculator 53 includes a gate circuit 58, an adder 59 and an accumulator (ACC1) 60, and provides the dispersion value of the amplitude of the reproduced waveform for the decision result "0" through the mean square of the error signal S5. The adder 54 adds the dispersion value from the first dispersion-value calculator 52 and a twos complement (a negative dispersion value) of the dispersion value from the second dispersion-value calculator 53, generating the error compensation signal S6 having a compensation error Verr.

The loop filter 38 includes a multiplier 61, an adder 62 and a register 63. The multiplier 61 multiplies the error compensation signal S6 from the dispersion-value calculator 37 by a predetermined coefficient $\mu$, thus generating a coefficient-multiplied signal. The adder 62 adds the coefficient-multiplied signal and the output signal of the register 63 and produces an added signal. The register 63 stores the added signal from the adder 62 and outputs the added signal as the filtered error compensation signal S7.

Figure 7:
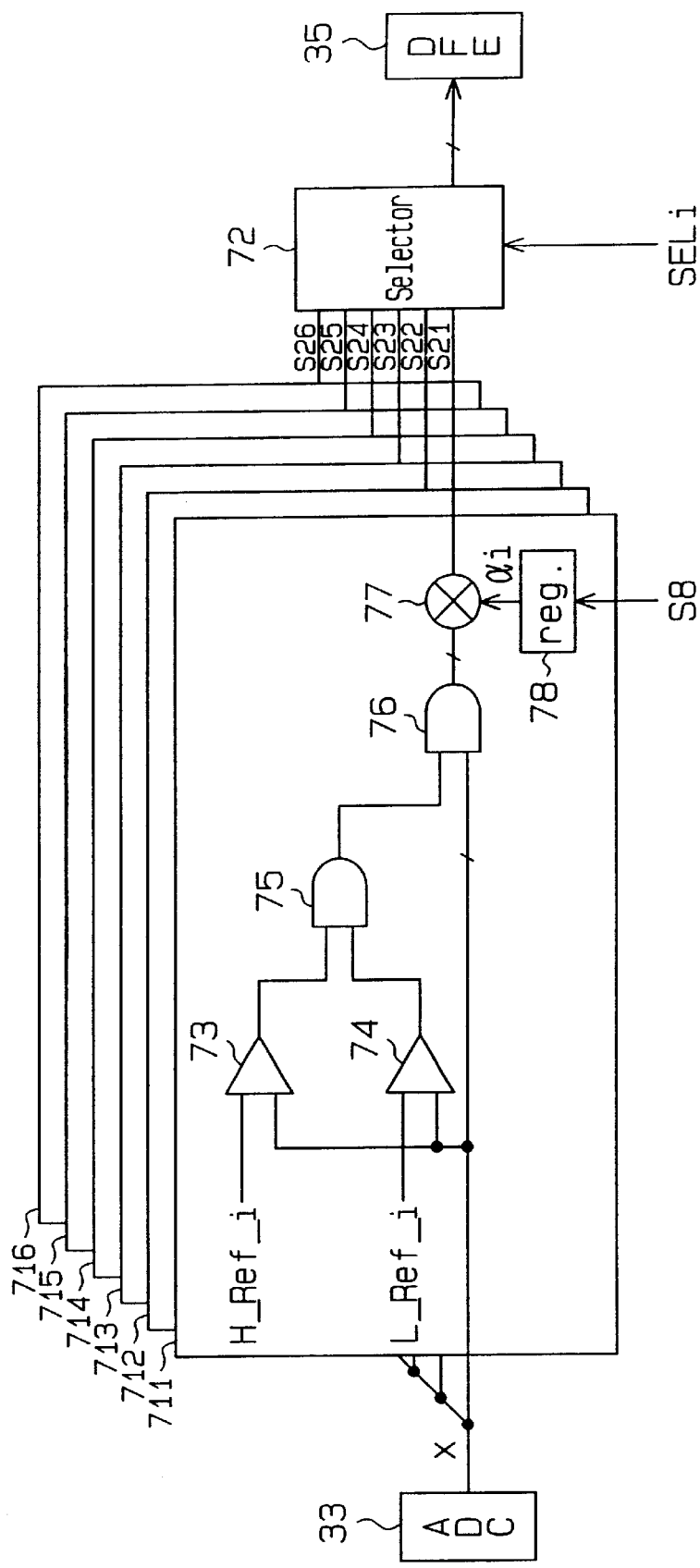
FIG. 7 is a schematic block diagram of an asymmetry compensator of the read channel LSI of FIG. 5.

FIG. 7 is a schematic circuit diagram of the asymmetry compensator 34.

The asymmetry compensator 34 includes six sub-compensators 711 to 716 corresponding to the respective sub-ranges and a selector 72. All of the sub-compensators 711–716 are supplied with an uncorrected read signal X from the ADC 33 and the compensation signal S8 from the adder 39.

The first sub-compensator 711 includes first and second comparators 73 and 74, first and second AND gates 75 and 76, a multiplier 77 and a register 78. A high-potential side voltage of the associated sub-range is input as a high reference voltage H_Ref_i to the first comparator 73, and a low-potential side voltage of the associated sub-range is input as a low reference voltage L_Ref_i to the second comparator 74.

The first comparator 73 receives the read signal X and the high reference voltage H_Ref_i (i=1 to 6) of the associated sub-range, and outputs an H-level signal when the potential of the read signal X is lower than the high reference voltage H_Ref_i. When the potential of the read signal X is higher than the low reference voltage L_Ref_i, the second comparator 74 outputs an H-level signal.

When the output signals of the first and second comparators 73 and 74 both have H levels, the first AND gate 75 sends an H-level output signal to the second AND gate 76. When the first AND gate 75 outputs the H-level signal (i.e., when the read signal X is in a range from the high reference voltage H_Ref_i to the low reference voltage L_Ref_i), the second AND gate 76 provides the multiplier 77 with the read signal X. The multiplier 77 multiplies the read signal X by a compensation value $\alpha$i ($\alpha$1 for the first sub-compensator 711; i=1 to 6) based on the compensation signal S8 stored in the register 78 and sends a corrected read signal to the selector 72.

The second to sixth sub-compensators 712–716 have the same structures as the first sub-compensator 711, and multiply the read signal X, which lies in the range from the high reference voltage H_Ref_i (i=2 to 6) to the low reference voltage L_Ref_i, by the compensation value $\alpha$i to respectively generate corrected read signals S22 to S26.

When the voltage (absolute value) of the read signal X is lower than the set voltage range of the associated sub-compensator, each register 78 stores the compensation signal S8. That is, each register 78 does not store the compensation signal S8 when the voltage of the read signal X is higher than the set voltage range of the associated sub-compensator.

Suppose that the voltage ranges are set in order of the first, second and third sub-compensators 711, 712 and 713 as the amplitude of the read signal increases from zero. In this case, the register 78 of the second sub-compensator 712 stores the compensation signal S8 when the voltage of the read signal X lies in the voltage range of the first sub-compensator 711. When the voltage of the read signal X comes into the voltage range of the second sub-compensator 712, therefore, the second sub-compensator 712 uses the compensation value $\alpha$1 of the first sub-compensator 711 stored in the register 78 thereof as the initial value.

The initial value may be set in each register 78 by providing a circuit for selectively supplying the compensation signal S8 to the individual sub-compensators 711–716. When the voltage of the read signal X enters the voltage range of one sub-compensator, this circuit supplies the compensation signal S8 to the register of that sub-compensator whose voltage range is higher than the former voltage range.

The selector 72 selects one of the corrected read signals S21–S26 from the respective sub-compensators 711–716 in accordance with a select signal SELi. The value of the select signal SELi is set so that every time the read signal X enters the voltage range of any of the individual sub-compensators 711–716, the associated sub-compensator is selected.

In the above-described manner, each of the sub-compensators 711–716 corresponding to the sub-ranges corrects the read signal X using the compensation value $\alpha$i and produces the read signal X that has a symmetry.

Figure 8:
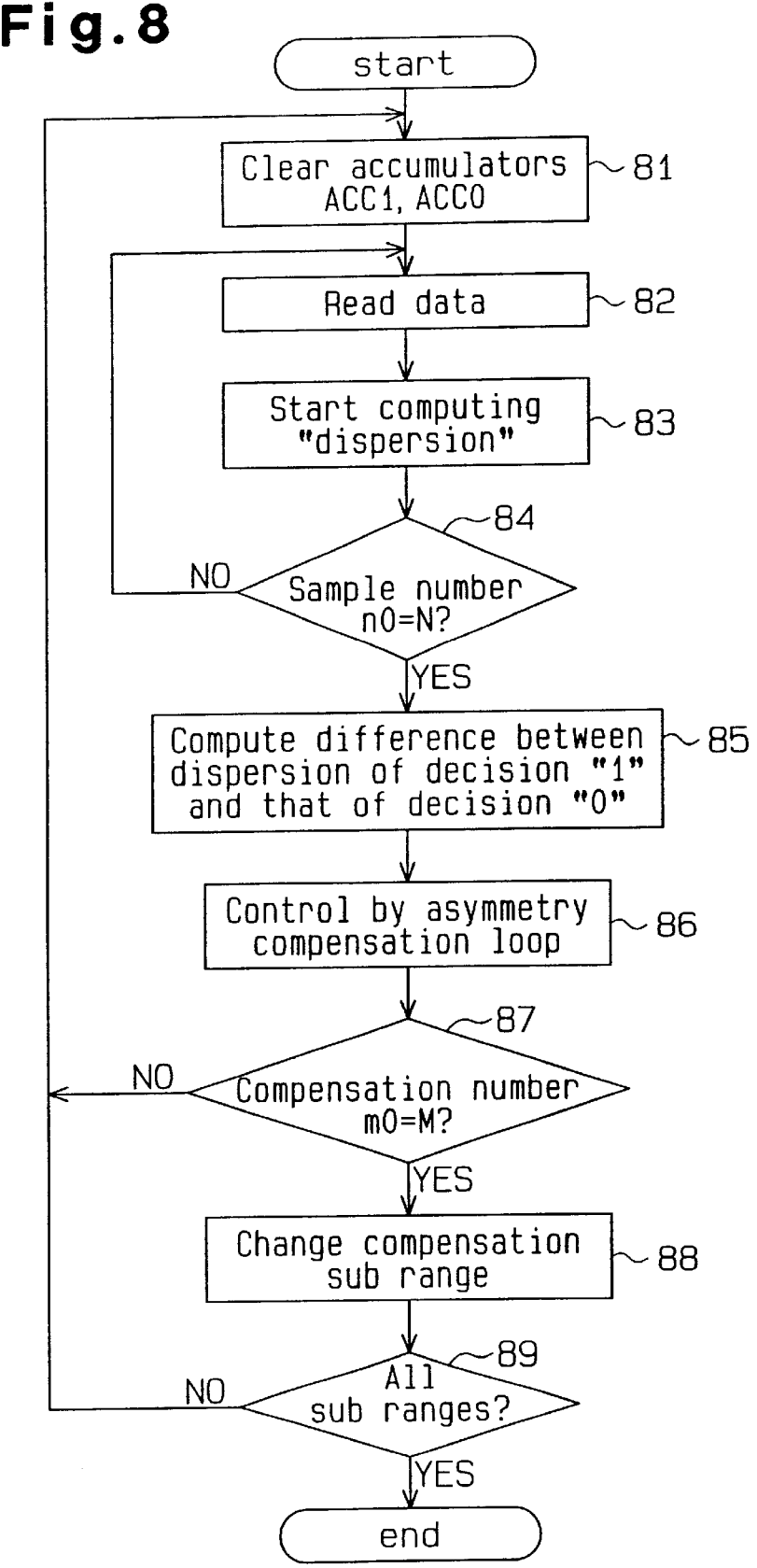
FIG. 8 is a flowchart for an asymmetry correcting routine which is executed by the read channel LSI of FIG. 5.

The asymmetry correcting routine that is executed by the read channel LSI (signal processor) 15 will now be explained with reference to the flowchart in FIG. 8.

First, the accumulator (ACC0) 57 and the accumulator (ACC1) 60 are cleared in step 81.

In step 82, the decision signal S4 and error signal S5 are generated using read data RD from the magnetic disk 13. In step 83, dispersion computation is initiated using the decision signal S4 and error signal S5.

In the next step 84, it is determined if a current sample number n0 coincides with a predetermined sample number N. When the sample number n0 is smaller than the predetermined sample number N, the flow goes to step 82 from step 84. That is, steps 82 to 84 are repeated until the sample number n0 reaches the predetermined sample number N.

When the sample number n0 reaches the predetermined sample number N, the flow proceeds to the step 85. In step 85, the difference between the dispersion value for the decision result "1" and the dispersion value for the decision result "0" is computed. Then, in step 86, asymmetry compensation control is carried out based on the difference.

In step 87, it is determined if a compensation number m0 coincides with a predetermined compensation number M. When the compensation number m0 is smaller than the predetermined compensation number M, the flow goes to step 81 from step 87. That is, steps 81 to 87 are repeated until the compensation number m0 reaches the predetermined compensation number M. This repeated compensation improves the precision of compensation values.

When the compensation number m0 reaches the predetermined compensation number M, the flow proceeds to step 88. In step 88, the compensation sub-range is switched to the next sub-range. In step 89, it is determined if compensation has been completed for all the sub-ranges. When compensation has not been completed yet, the flow returns to step 81. When compensation has been completed, the asymmetry correcting routine is terminated.

The read channel LSI 15 is constructed so as to avoid the influence of the AGC loop and PLL while calculating dispersion values. This design allows high-precision compensation values to be swiftly produced.

Specifically, the signal processor 15 holds the AGC loop and PLL in such a way that the first and second DACs 47 and 50 in the loop control circuit 36 output constant signals. As the AGC 31 amplifies the read signal RD with a constant gain, therefore, the amplitude of the reproduced waveform does not change. Further, the loop control circuit 36 outputs the sampling clock SCK having a constant period, thus stabilizing the sampling timing.

The error signal S5 is used for generation of the sampling clock SCK and gain control of the AGC 31 as well as for computation of dispersion values. If an operation synchronous with the sampling clock SCK or the gain control of the AGC 31 is underway, the sampling timing or the amplitude of the reproduced signal waveform is not stable so that accurate dispersion values will not be acquired.

The signal processor 15 may operate to suppress the operation of the AGC/PLL. That is, the signal processor 15 may alter the loop constant of the loop control circuit 36 in such a way that at least one of a change in the gain of the AGC 31 and a change in the frequency of the sampling clock SCK becomes smaller. This also stabilizes a change in the amplitude of the reproduced waveform and the sampling timing.

The signal processor 15 writes pattern data for stabilizing the AGC/PLL on the magnetic disk 13. The AGC/PLL is likely to be stable when the read data RD read from the magnetic disk 13 has a periodic pattern. When the read data RD has a random pattern, on the other hand, the compensation loop improves the precision of dispersion values.

FIG. 13(a) schematically shows the recording format of an ordinary sector. A sector 91 includes a preamble area 91a, a sync byte (SB) area 91b and a data area 91c.

Recorded in the preamble area 91a is a preamble code including control data which is used to set the amplification factor of the AGC 31 and produce the sampling clock SCK synchronous with the read signal RD. The preamble code may be, for example, "111000" and the read signal RD of the preamble code has a sine wave. The loop control circuit 36 generates the sampling clock SCK in accordance with the read signal RD having the sine wave. The ADC 33 generates a digital read signal RD in accordance with the sampling clock SCK.

Recorded in the sync byte area 91b is a sync byte code (SB code) which is mainly used to detect the beginning of the next data area 91c. The HDC 19 treats the data in the data area 91c following the sync byte code as recorded data and processes this recorded data.

The signal processor 15 in the first embodiment records various patterns in a sector 92 on the magnetic disk 13 in the recording format as shown in FIG. 13(b). The sector 92 includes a preamble area 92a, a sync byte area 92b, a first pattern area 92c and a second pattern area 92d. A periodic pattern is recorded in the first pattern area 92c, and a random pattern in the second pattern area 92d.

The signal processor 15 first stabilizes the AGC/PLL in accordance with the read data RD of the periodic pattern read from the first pattern area 92c. Thereafter, the signal processor 15 holds the AGC/PLL and computes high-precision dispersion values using the read data RD of the random pattern read from the second pattern area 92d.

As an alternative, various patterns may be recorded in a sector 93 in the recording format as shown in FIG. 13(c). The sector 93 includes a preamble area 93a, a sync byte area 93b, and first to fourth pattern areas 93c to 93f. A periodic pattern and random pattern are alternately recorded in the first to fourth pattern areas 93c–93f. In accordance with the periodic and random patterns, the signal processor 15 alternately performs stabilization of the AGC/PLL and computation of dispersion values.

The signal processor 15 in the first embodiment has the following advantages.

(1) The dispersion-value calculator 37 computes the dispersion value for the decision result "1" and the dispersion value for the decision result "0" using the error signal S5 between the waveform-equalized signal S3 and the decision signal S4, and produces a compensation signal 56 from the two dispersion values. The asymmetry compensator 34 divides the range of the input signal into a plurality of sub-ranges and corrects the asymmetry of the input signal sub-range by sub-range in accordance with the compensation value $\alpha i$ corresponding to the compensation signal S8. Accordingly, the asymmetry of the read data RD is detected and corrected while the read data is being input, thus ensuring highly accurate and effective correction.

(2) The asymmetry compensator 34 determines the compensation value in a direction from a sub-range near zero (base line) toward a sub-range in which the amplitude gradually increases. That is, the compensation value is determined in accordance with the characteristic of the read signal (the characteristic of the head unit 14) whose asymmetry increases as the amplitude gradually increases.

(3) The asymmetry compensator 34 uses the compensation value determined for a sub-range of a small amplitude as the initial compensation value for the next sub-range. The use of the compensation value this way makes the time needed for determining the compensation value shorter as compared with the case where the initial value is reset to, for example, zero.

(4) During calculation of dispersion values, the signal processor 15 restricts the operation of the loop by holding the AGC loop and PLL control or changing the loop constant. Accordingly, the dispersion-value calculator 37 and the asymmetry compensator quickly provide high-precision compensation values without being influenced by the AGC/PLL.

(5) The signal processor 15 first stabilizes the AGC/PLL in accordance with the read data RD of a periodic pattern read from the first pattern area 92c and then acquires dispersion values in accordance with the read data RD of a random pattern read from the second pattern area 92d. This provides high-precision dispersion values while reducing the influence of the AGC/PLL on the computation of the dispersion values.

Figure 14:
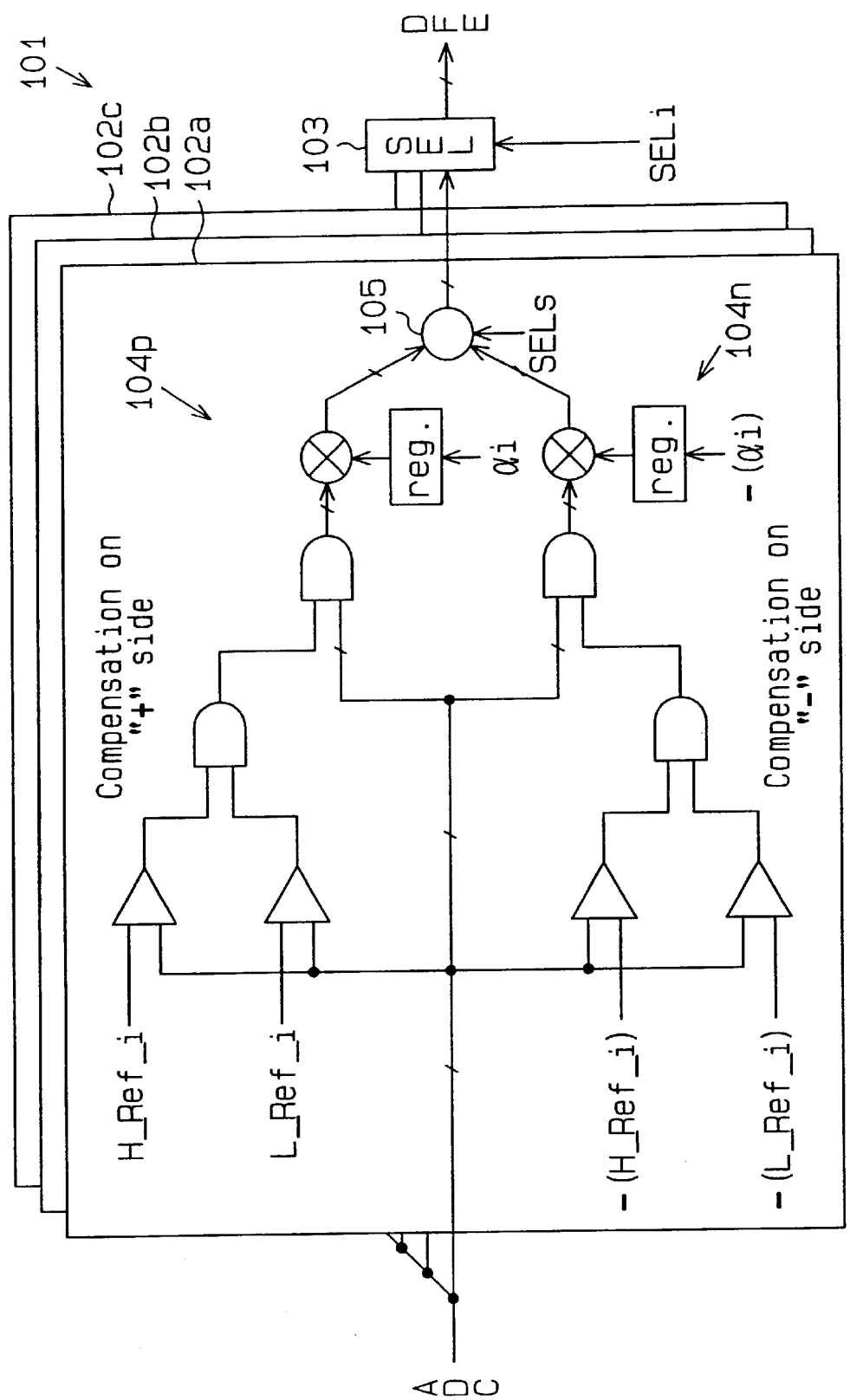
FIG. 14 is a schematic block diagram of another example of an asymmetry compensator in accordance with the present invention.

In the first embodiment, an asymmetry compensator 101 as shown in FIG. 14 may be used. This asymmetry compensator 101 includes three sub-compensators 102a, 102b and 102c and a selector 103. Each of the sub-compensators 102a–102c includes sub compensation sections 104p and 104n, provided symmetrical to the base line, and a selector 105. The asymmetry compensator 101 almost simultaneously corrects the asymmetry in directions toward the positive amplitude and the negative amplitude from near zero. This shortens the time needed for correcting the asymmetry.

Second Embodiment

Figure 15:
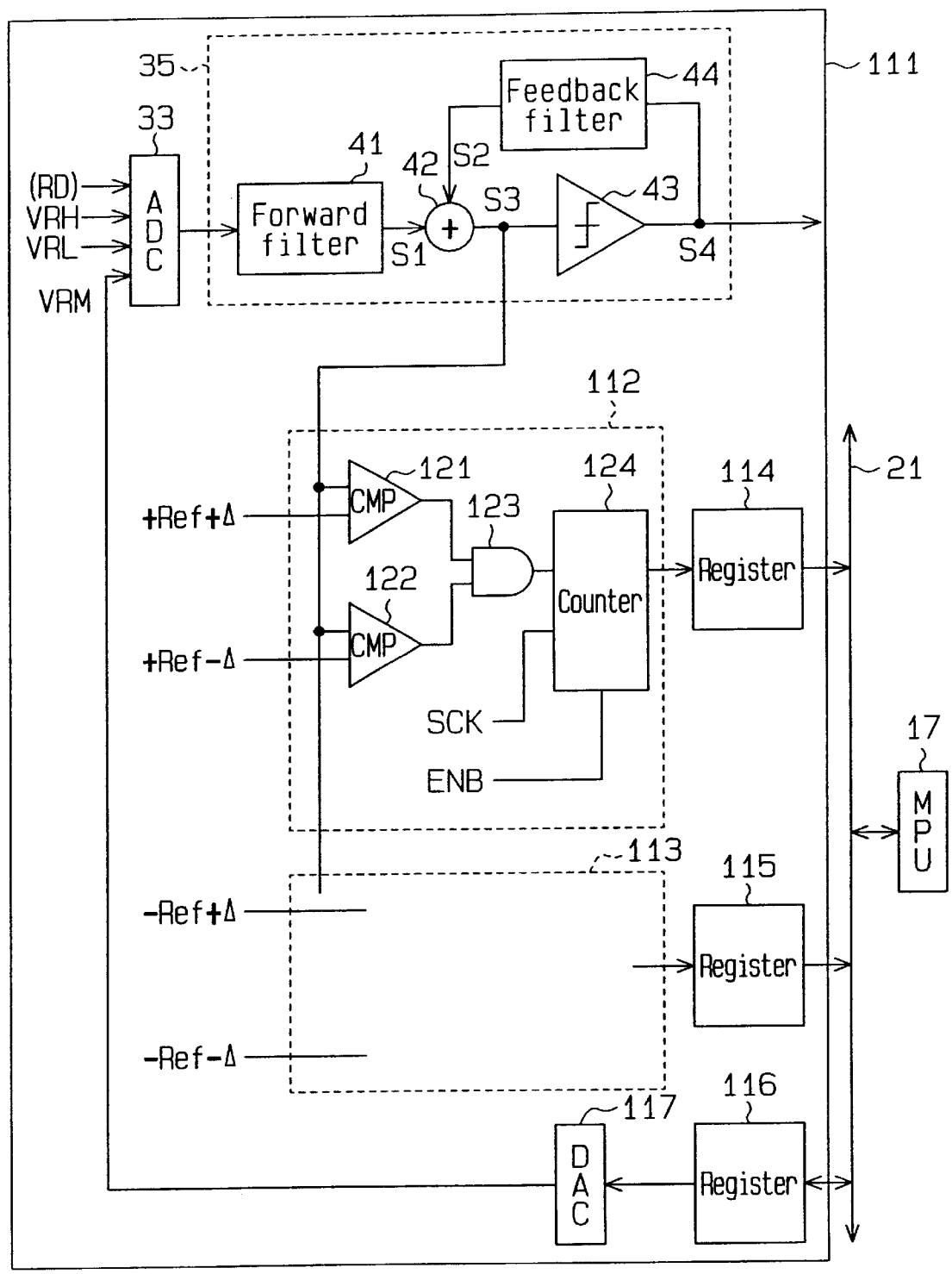
FIG. 15 is a schematic block diagram of a read channel LSI according to a second embodiment of the present invention.

FIG. 15 is a schematic block diagram of a signal processor or read channel LSI (signal processor) 111 according to a second embodiment of the present invention. The read channel LSI 111 includes first and second base-line compensation detectors 112 and 113, three registers 114, 115 and 116 and a DAC 117 in addition to the structure of the first embodiment. The first and second base-line compensation detectors 112 and 113 have the same structure and are provided to determine the necessity for the base line correction. In FIG. 15, the AGC 31, the analog filter 32, the asymmetry compensator 34, the loop control circuit 36, the dispersion-value calculator 37, the loop filter 38, the multiplier 39 and the adder 45 are not shown.

The first detector 112 includes first and second comparators 121 and 122, an AND gate 123 and a counter circuit 124.

The first comparator 121 receives the waveform-equalized signal S3 from the DFE 35 and a first detection range voltage +Ref+Δ and outputs an H-level signal when the voltage of the waveform-equalized signal S3 is lower than the first detection range voltage +Ref+Δ. The first detection range voltage +Ref+Δ is set higher than the positive reference voltage +Ref of the decision circuit 43.

The second comparator 122 receives the waveform-equalized signal S3 from the DFE 35 and a second detection range voltage +Ref−Δ and outputs an H-level signal when the voltage of the waveform-equalized signal S3 is higher than the second detection range voltage +Ref−Δ. The second detection range voltage +Ref−Δ is set lower than the positive reference voltage +Ref of the decision circuit 43.

The AND gate 123 outputs an H-level signal when the voltage of the waveform-equalized signal S3 lies between the first detection range voltage +Ref+Δ and the second detection range voltage +Ref−Δ.

The counter circuit 124 clears the count value in response to an enable signal ENB which has an L level, and counts the sampling clock signal SCK in response to the H level enable signal ENB and the H level signal from the AND gate 123. The counter circuit 124 counts the number of samples of the waveform-equalized signal S3 whose voltage lies between the first and second detection range voltages +Ref+Δ and +Ref−Δ. That is, the number of samples of the waveform-equalized signal in the vicinity of the positive reference voltage +Ref is counted. The first sample number counted by the counter circuit 124 is stored in the first register 114.

The second detector 113 counts the number of samples of the waveform-equalized signal S3 whose voltage lies between a first detection range voltage −Ref+Δ and a second detection range voltage −Ref−Δ, and stores the counted second sample number in the second register 115. The first detection range voltage −Ref+Δ is set higher than the negative reference voltage −Ref and the second detection range voltage −Ref−Δ is set lower than the negative reference voltage −Ref.

The MPU 17 receives the first and second sample numbers, respectively stored in the first and second registers 114 and 115, via the bus 21, and determines if base line correction is needed and computes a compensation value both based on those sample numbers. Specifically, the MPU 17 determines that base line correction is necessary when the difference between the first and second sample numbers is greater than a predetermined value. The predetermined value is preset in accordance with the tolerance range of the asymmetry. Then, the MPU 17 computes a compensation value based on the difference between both sample numbers and updates the compensation value stored in the third register 116 with the computed one.

The DAC 117 receives the compensation value stored in the third register 116 and provides the ADC 33 with an intermediate voltage VRM according to the input signal. The ADC 33 receives the filtered read signal RD from the analog filter 32, the high reference voltage VRH, a low reference voltage VRL and the intermediate voltage VRM from the DAC 117, and converts the filtered read signal RD having the same level as the intermediate voltage VRM to a digital signal having a value of zero. Changing the level of the intermediate voltage VRM therefore corrects the level of the filtered read signal RD which is to be converted to a digital signal having a value of zero or corrects the base line.

Figure 16:
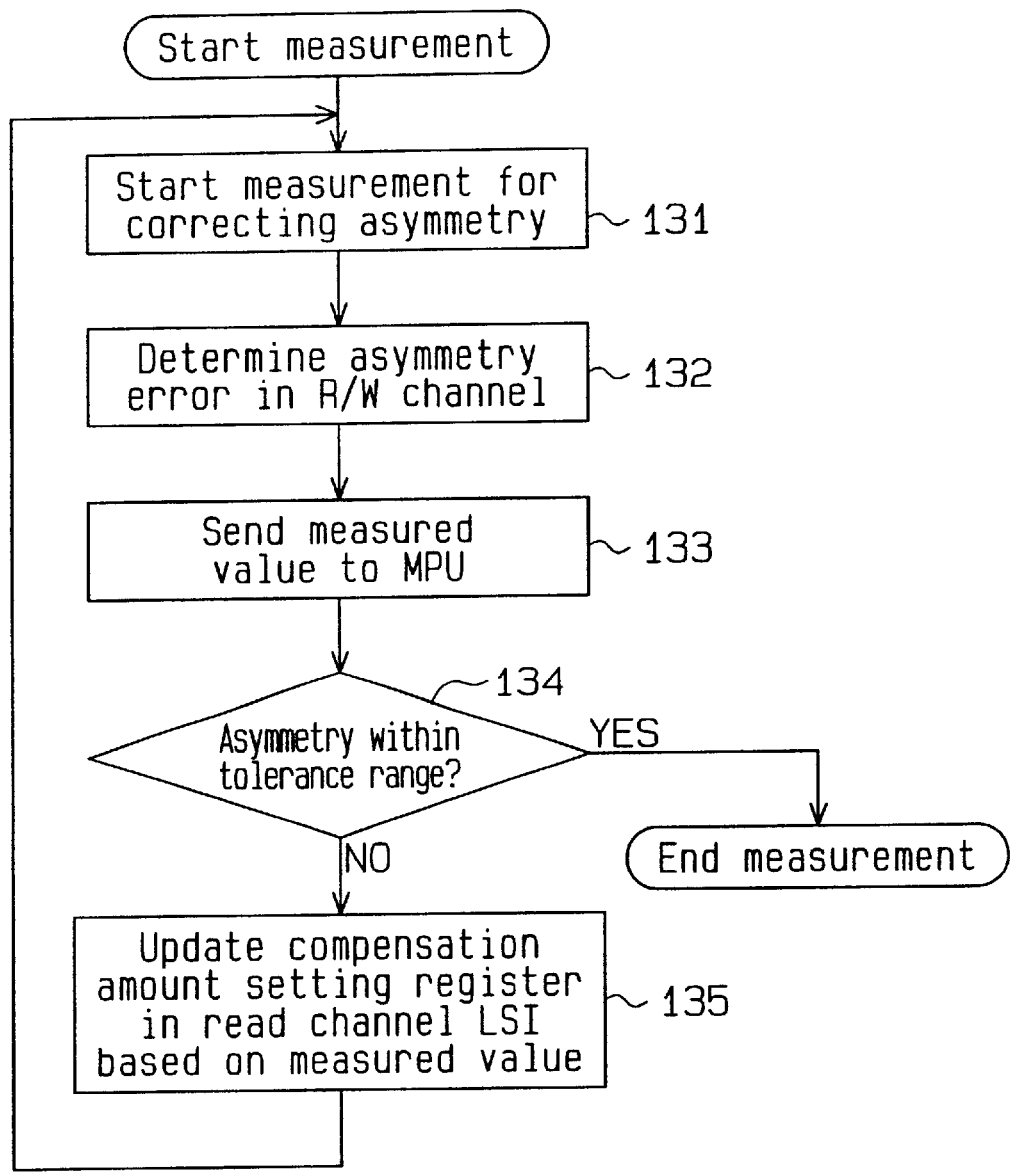
FIG. 16 is a flowchart for a base-line correcting routine executed by the read channel LSI of FIG. 15.

The base line correcting routine will now be discussed with reference to the flowchart in FIG. 16.

In the first step 131, the MPU 17 outputs the H-level enable signal ENB which initiates measurement for correcting the asymmetry. In step 132, the read channel LSI 111 measures an asymmetry error by counting the numbers of samples near the positive and negative reference voltages. The measured value is given to the MPU 17 from the read channel LSI 111.

In step 134, the MPU 17 determines based on the measured value if the asymmetry is within the tolerance range. When the asymmetry is out of the tolerance range, the flow proceeds to step 135. In step 135, a compensation value is computed based on the measured value and the compensation value in the third register 116 in the read channel LSI 111 is updated with that computed value. Then, the flow goes to step 131. When the asymmetry is within the tolerance range in step 134, the routine is terminated. The base line is corrected by repeating the measurement of the asymmetry error and the setting of the compensation value in this manner.

Thereafter, the read channel LSI 111 corrects the asymmetry using polygonal-line approximation as per the first embodiment.

The base line correction is effective for a reproduced waveform which has a large asymmetry. That is, high-precision correction is accomplished by correcting the asymmetry to some degree by implementing the base line correction and then performing the asymmetry correcting routine of the first embodiment.

The read channel LSI 111 according to the second embodiment has the following advantages.

(1) The first and second base-line compensation detectors 112 and 113 acquire dispersion values within predetermined ranges around the reference levels +Ref and −Ref. The MPU 17 calculates compensation values based on the dispersion values. In accordance with the compensation values, the DAC 117 corrects the intermediate reference voltage VRM for determining the zero level to be output from the ADC 33 or corrects the base line. Therefore, the asymmetry is measured during data input and the base line is corrected based on the result of the measurement.

(2) When the waveform-equalized signal S3 is present within predetermined ranges around the predetermined reference levels +Ref and −Ref, the counter circuit 124 counts the sampling clock SCK. Therefore, dispersion in the vicinity of the reference levels is easily measured based on the count value.

The dispersion values of the waveform-equalized signal may be acquired by using four or more reference levels of even numbers instead of two reference levels +Ref and −Ref.

The MPU 17 may directly receive the first and second sample numbers from the first and second detectors 112 and 113 instead of receiving them from the first and second registers 114 and 115.

Third Embodiment

Figure 17:
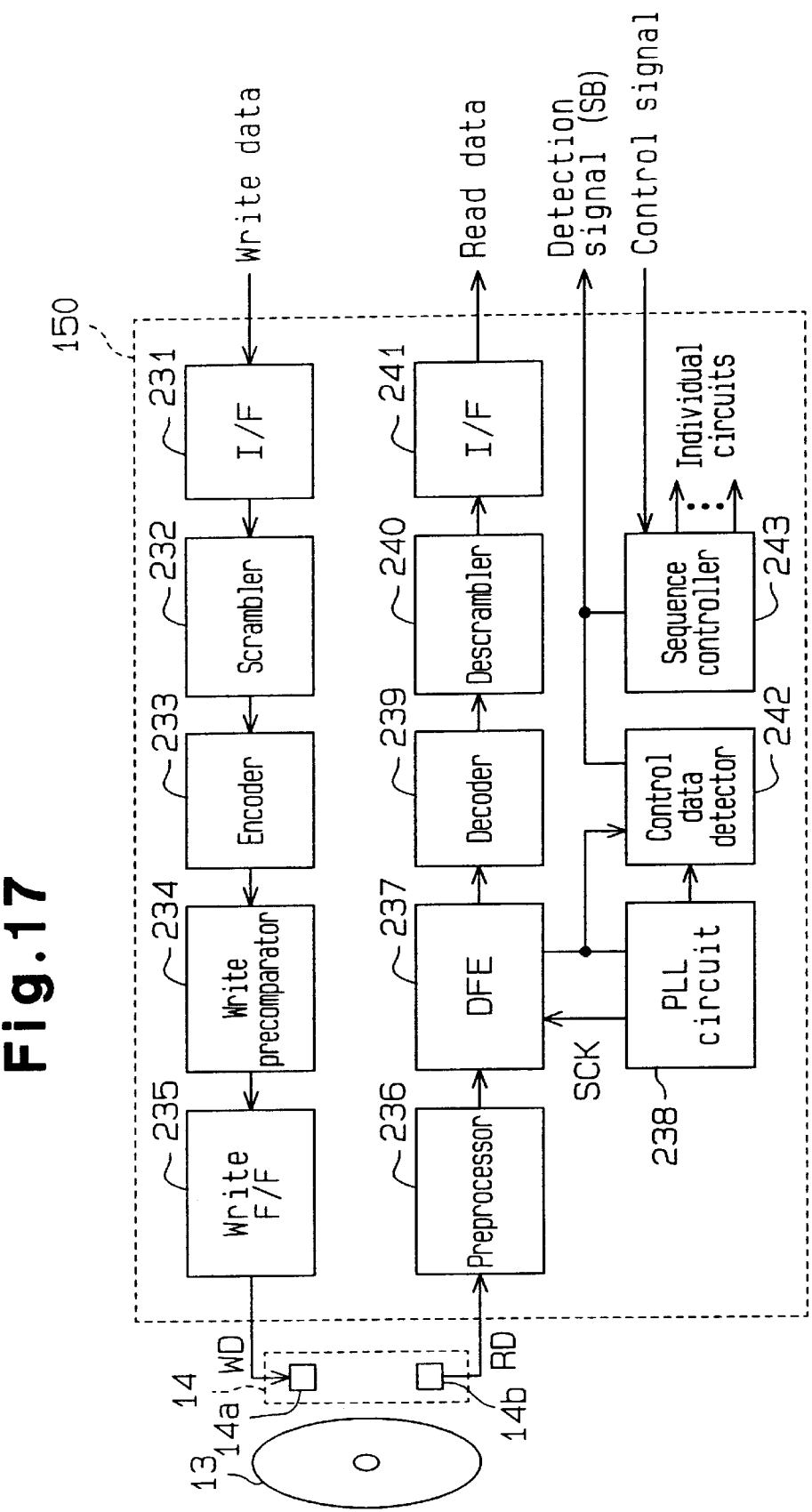
FIG. 17 is a schematic block diagram of a signal processor according to a third embodiment of the present invention.

FIG. 17 is a schematic block diagram of a signal processor or read channel LSI 150 according to a third embodiment of the present invention. Write data supplied from the MPU 17 is supplied to a scrambler 232 via a first interface circuit 231. The scrambler 232 performs a scramble process for changing the order of bits in the write data in accordance with a predetermined process, and supplies scrambled write data to an encoder 233. The encoder 233 encodes the scrambled write data according to a predetermined RLL (Run-Length Limited) code (specifically, RLL (1,7) code). The encoder 233 affixes control data including preamble data for controlling a reading operation to the encoded data. The encoder 233 supplies the resultant signal to a write precomparator 234.

The write precomparator 234 receives the encoded data from the encoder 233 and subjects the encoded data to a process for correcting the data write timing to the magnetic disk 13. The timing correcting process is carried out in order to prevent the positions of write information ("1", "0") on the magnetic disk 13 from deviating due to the influence of the adjoining magnetic poles. The write precomparator 234 converts the encoded data after the correction to data according to the NRZI format and then outputs the resultant data.

A write flip-flop (F/F) 235 receives the encoded data from the write precomparator 234 and supplies a write signal WD to the write head 14a of the head unit 14, which is comprised of a coil. The write F/F 235 supplies a current corresponding to the write data to the magnetic disk 13. This current forms magnetic poles on the magnetic disk 13, thereby recording information including data, the preamble and the sync byte on the magnetic disk 13.

The read head 14b of the head unit 14 includes an MR (Magneto Resistive) head and provides a preprocessor 236 with a read signal RD which corresponds to a change in the magnetic poles of the magnetic disk 13. The preprocessor 236 amplifies and filters the read signal RD, thereby producing a filtered read signal whose frequency is suitable for demodulation and decoding. The preprocessor 236 converts the filtered read signal to a digital read signal, equalizes the digital read signal and sends the equalized digital signal to a DFE 237.

The DFE 237 performs waveform equalization and determination processes on the equalized digital signal from the preprocessor 236 in accordance with the sampling clock SCK from a PLL circuit 238, and produces a decision signal. The PLL circuit 238 generates the sampling clock SCK synchronous with the read signal RD by using the decision signal from the DFE 237.

A decoder 239 receives the decision signal from the DFE 237, decodes the decision signal according to the RLL code and supplies the decoded data to a descrambler 240. The descrambler 240 performs a descrambling process, which includes rearranging the bits of the decoded data in accordance with a predetermined process, thus generating descrambled decoded data. The descrambled decoded data is supplied via a second interface circuit 241 to the MPU 17 as read data.

Figure 18:
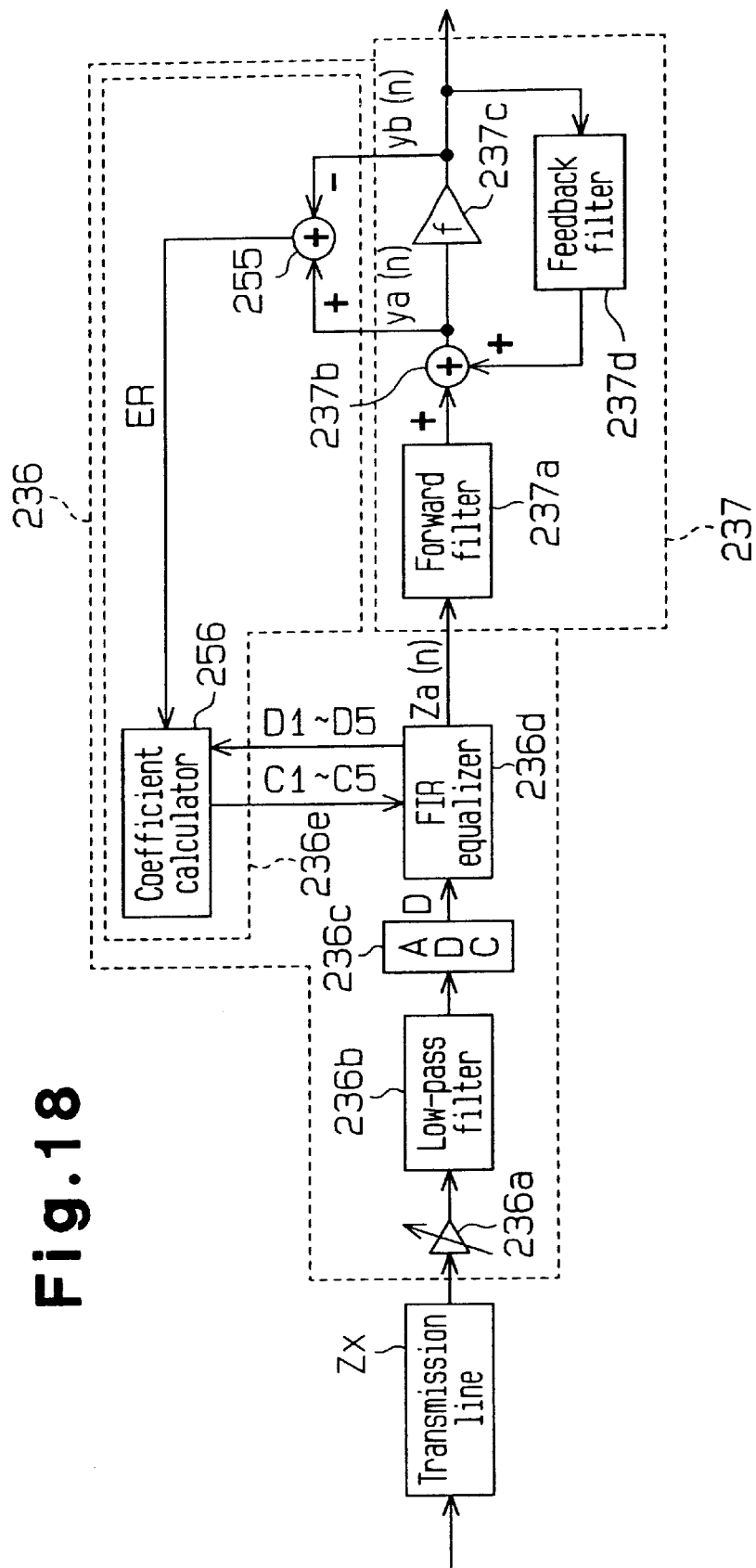
FIG. 18 is a schematic block diagram of a preprocessor and a DFE of the signal processor of FIG. 17.

FIG. 18 is a schematic block diagram illustrating the preprocessor 236 and the DFE 237. The DFE 237 includes a forward filter 237a, an adder 237b, a decision circuit 237c and a feedback filter 237d.

The forward filter 237a, which preferably includes an FIR (Finite Impulse Response) filter, receives the equalized digital signal from the preprocessor 236 and filters it in such a way as to maximize the S/N ratio of the digital signal, thereby generating a filtered digital signal.

The adder 237b adds the filtered digital signal from the forward filter 237a and the feedback signal from the feedback filter 237d, generating a waveform-equalized signal.

The decision circuit 237c compares the waveform-equalized signal from the adder 237b with a reference voltage and generates a decision signal having a decision result of "1" or "0".

The feedback filter 237d, which preferably includes an FIR filter, receives the decision signal from the decision circuit 237c and generates the feedback signal S2 by eliminating intersymbol interference from the decision signal. The feedback signal S2 is supplied to the adder 237b from the feedback filter 237d. This feedback loop provides a reproduced signal which is free of interference from old bits.

Referring again to FIG. 17, a control data detector 242 receives the decision signal from the DFE 237, detects control data (preamble and sync byte) for controlling the readout of recorded data and information (servo mark) for servo control and sends detection signals to a sequence controller 243 and the MPU 17.

The sequence controller 243 receives the detection signals from the detector 242 and the write/read control signal from the MPU 17, and controls the signal processor 150 in accordance with a predetermined write/read sequence.

When receiving a sync byte detection signal after providing a read operation to the signal processor 150, the MPU 17 processes the read data following the sync byte as recorded data.

As shown in FIG. 18, the preprocessor 236 includes an auto gain control amplifier (AGC) 236a, a low-pass filter 236b serving as an analog filter, an analog-to-digital converter (ADC) 236c, an FIR equalizer 236d and a coefficient updating circuit 236e.

The AGC 236a amplifies the read signal RD from the head 14 and sends the amplified read signal to the low-pass filter 236b. The low-pass filter 236b filters the amplified read signal from the AGC 236a, thus producing a filtered read signal whose frequency is suitable for demodulation and decoding. The ADC 236c receives the filtered read signal from the low-pass filter 236b and converts the filtered read signal to a digital signal by sampling the filtered read signal according to the sampling clock SCK.

The FIR equalizer 236d equalizes the waveform of the digital signal in accordance with the transmission line Zx from the head unit 14 to the preprocessor 236 and the transmission characteristic of the analog signal from the AGC 236a to the low-pass filter 236b, thus producing an equalized digital signal Za(n) corresponding to a predetermined transmission characteristic. It is preferable that the FIR equalizer 236d should include an FIR filter.

Figure 19:
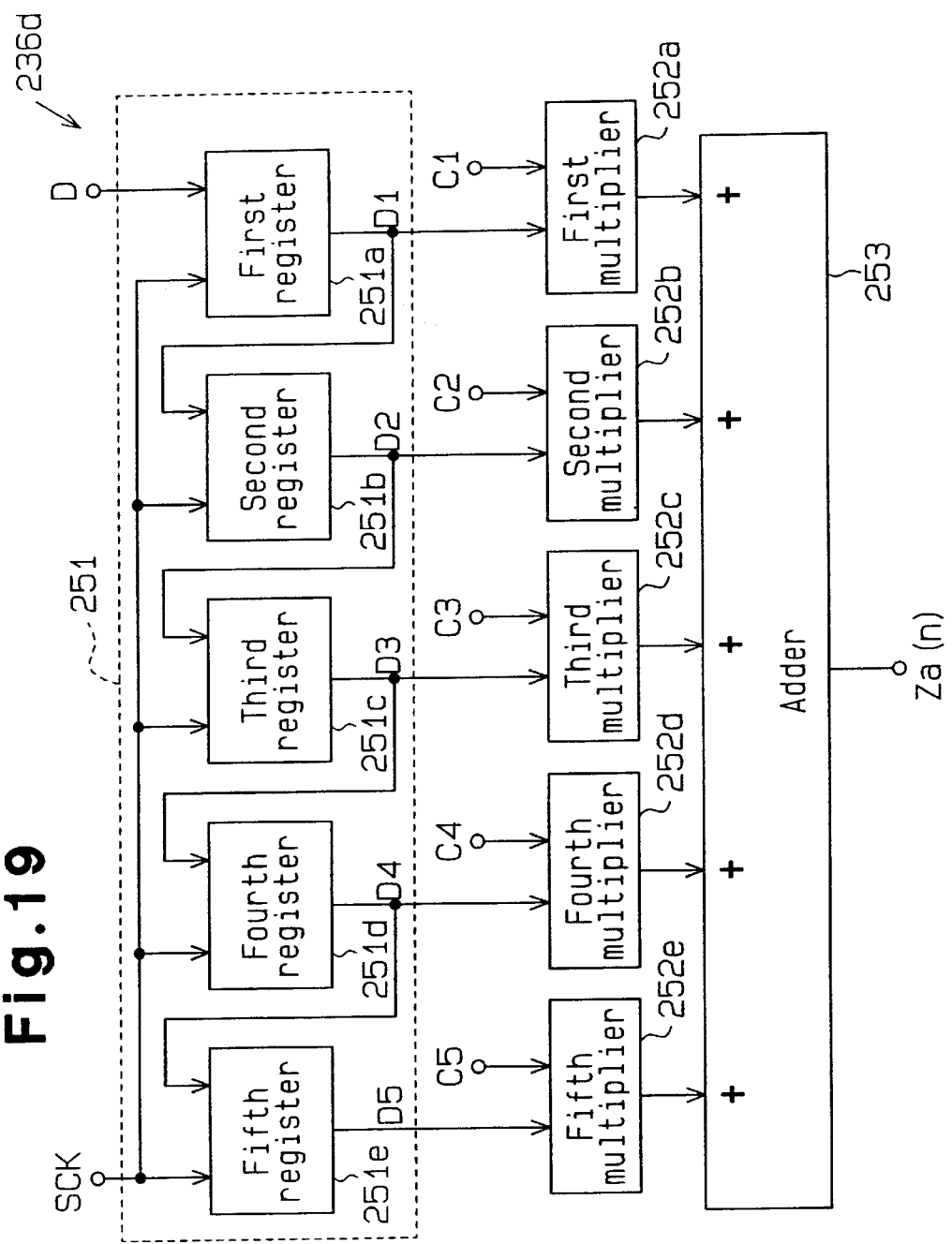
FIG. 19 is a schematic block diagram of an FIR equalizer of the preprocessor of FIG. 18.

FIG. 19 is a schematic block diagram of the FIR equalizer 236d. The FIR equalizer 236d has a shift register 251 including a plurality of (five in this case) registers 251a to 251e, five multipliers 252a to 252e corresponding to the registers 251a–251e, and an adder 253.

The registers 251a–251e are connected in series, and each register samples the digital signal from the ADC 236c or the digital signal from the previous-stage of register and supplies the sampled data to the next stage of register. That is, the shift register 251 stores sampled old data.

The multipliers 252a–252e respectively receive data D1 to D5 stored in the respective registers 251a–251e and predetermined coefficients C1 to C5 supplied from the coefficient updating circuit 236e and respectively multiply the data D1–D5 by the coefficients C1–C5. The adder 253 receives the multiplication results from the multipliers 252a–252e and adds the five multiplication results to thereby produce an equalized digital signal Za(n).

Referring again to FIG. 18, the coefficient updating circuit 236e computes the coefficients C1–C5 using an added signal ya(n) output from the adder 237b and a decision signal yb(n) output from the decision circuit 237c. The individual coefficients C1–C5 are acquired from the following equations using an LMS (Least Mean Square) algorithm.

$$C1 = C1b + \mu \cdot D1 \cdot ER$$

$$C2 = C2b + \mu \cdot D2 \cdot ER$$

$$C3 = C3b + \mu \cdot D3 \cdot ER$$

$$C4 = C4b + \mu \cdot D4 \cdot ER$$

$$C5 = C5b + \mu \cdot D5 \cdot ER$$

where C1b–C5b are coefficients before updating, ER is an error between the added signal ya(n) and the decision signal yb(n) (ya(n)–yb(n)), D1–D5 are data to be stored in the respective registers 251a–251e, and $\mu$ is a step width.

The coefficient updating circuit 236e includes an error-calculation adder 255 and a coefficient calculator 256. The error-calculation adder 255 adds the added signal ya(n) and the decision signal yb(n) together, generating an equalization error signal ER (ya(n)–yb(n)). The coefficient calculator 256 receives the equalization error signal ER from the error-calculation adder 255 and computes the mean square error of the equalization error signal ER. The coefficient calculator 256 calculates the coefficients C1–C5 in such a way as to minimize the computed mean square error. The coefficient calculator 256 includes a plurality of coefficient calculating sections provided in association with the coefficients C1–C5.

Figure 20:
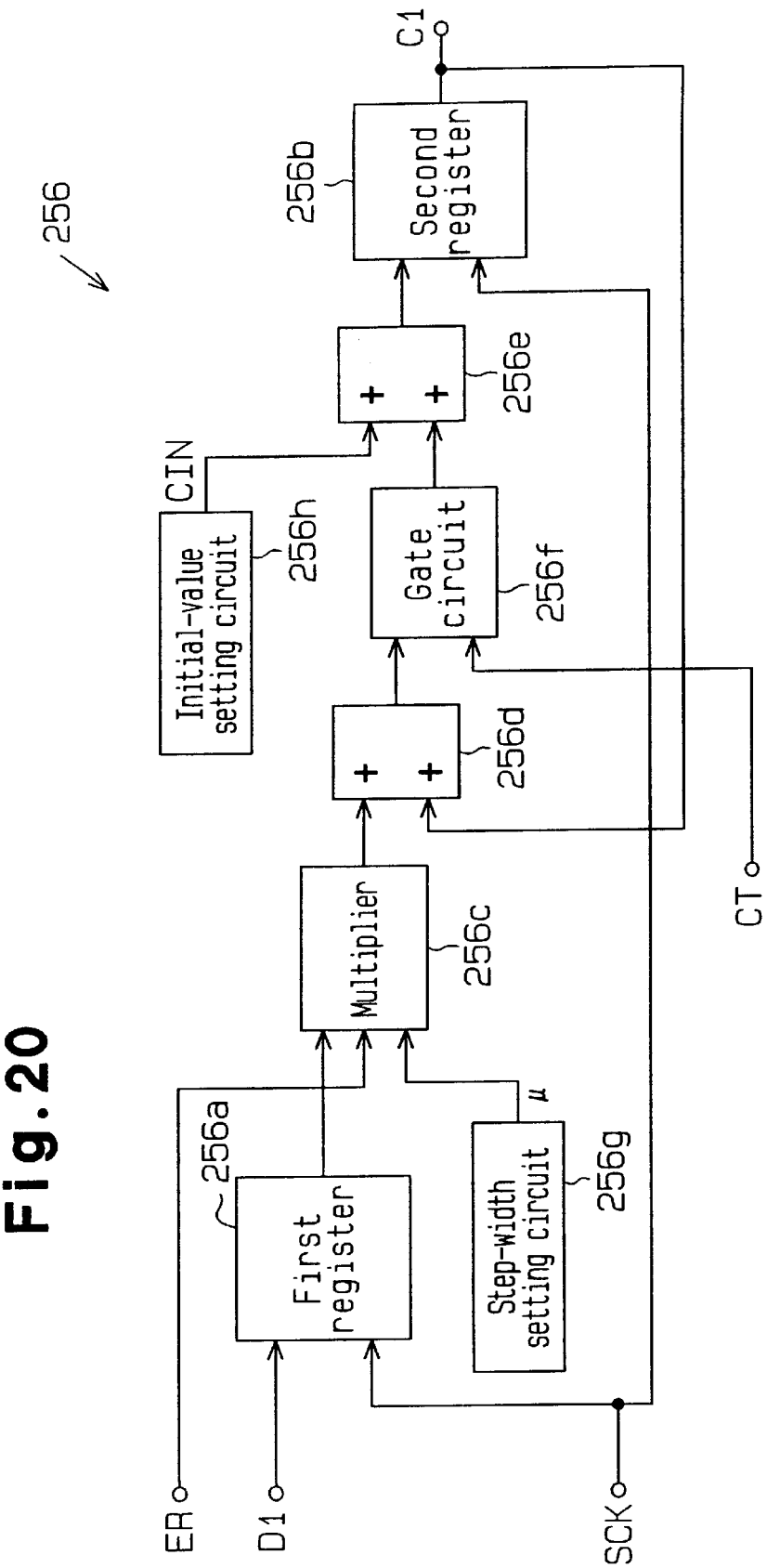
FIG. 20 is a schematic block diagram of a coefficient calculator of the preprocessor of FIG. 18.

FIG. 20 is a schematic block diagram of the coefficient calculating section for the coefficient C1. As the coefficient calculating sections for the remaining coefficients C2–C5 have the same structures as the coefficient calculating section for the coefficient C1, they are not shown in the diagram.

The coefficient calculator 256 includes two registers 256a and 256b, a multiplier 256c, two adders 256d and 256e, a gate circuit 256f, a step-width setting circuit 256g and an initial-value setting circuit 256h.

The first register 256a samples data D1 stored in the first register 251a in the FIR equalizer 236d in synchronism with the sampling clock SCK and provides the multiplier 256c with the sampled data D1.

The multiplier 256c multiplies the sampled data D1 from the first register 256a by the equalization error signal ER and the predetermined step width $\mu$ from the step-width setting circuit 256g, and supplies the multiplication result ($\mu \cdot D1 \cdot ER$) to the first adder 256d.

The first adder 256d adds the multiplication result from the multiplier 256c and the coefficient C1b before updating from the second register 256b, and sends the addition result (C1b+$\mu \cdot D1 \cdot ER$) to the gate circuit 256f.

When a control signal CT from the MPU 17 has an H level, the gate circuit 256f sends the addition result from the first adder 256d to the second adder 256e.

The second adder 256e is supplied with an initial value CIN from the initial-value setting circuit 256h when the second adder 256e performs the first operation, and is supplied with "0" in place of the initial value CIN in subsequent operations.

The second adder 256e sends the initial value CIN to the second register 256b in the first operation. In the subsequent operations, the second adder 256e sends the addition result (C1b+$\mu \cdot D1 \cdot ER$) from the first adder 256d to the second register 256b.

The second register 256b samples the addition result from the second adder 256e in synchronism with the sampling clock SCK and supplies the sampled addition result as a new coefficient C1 (C1b+$\mu \cdot D1 \cdot ER$) to the first multiplier 252a of the FIR equalizer 236d. The first multiplier 252a multiplies the data D1 by the new coefficient C1.

The signal processor 150 according to the third embodiment has the following advantages.

(1) The FIR equalizer 236d provides the DFE 237 with the equalized digital signal Za(n) which minimizes the mean square error between the added signal from the adder 237b and the decision signal from the decision circuit 237c. The digital signal Za(n) is free of noise which is generated in the analog signal system due to use conditions, manufacturing variations and time-dependent changes. It is therefore unnecessary to adjust the coefficients of the forward filter 237a and the feedback filter 237d in consideration of such noise. In other words, the coefficients of the forward filter 237a and the feedback filter 237d only have to be optimized for the characteristic of the FIR equalizer 236d. This eliminates the need for a coefficient calculator for the forward filter 237a and the feedback filter 237d, thereby reducing the circuit area of the DFE 237 accordingly.

The coefficient calculator 256 has five coefficient calculating sections in association with the number of taps of the FIR equalizer 236d (five in this embodiment). However, the number of taps of the FIR equalizer 236d is significantly smaller than the number of taps of the forward filter 237a and the feedback filter 237d. Therefore, an increase in the circuit area of the DFE 237 associated with the coefficient calculator 256 is suppressed.

(2) The individual coefficients C1–C5 of the FIR equalizer 236d are set so as to minimize the mean square error between the added signal ya(n) from the adder 237b and the decision signal yb(n) from the DFE 237. That is, as the coefficients C1–C5 of the FIR equalizer 236d are updated based on the decision result from the DFE 237, the DFE 237 can make a high-precision decision.

Fourth Embodiment

Figure 21:
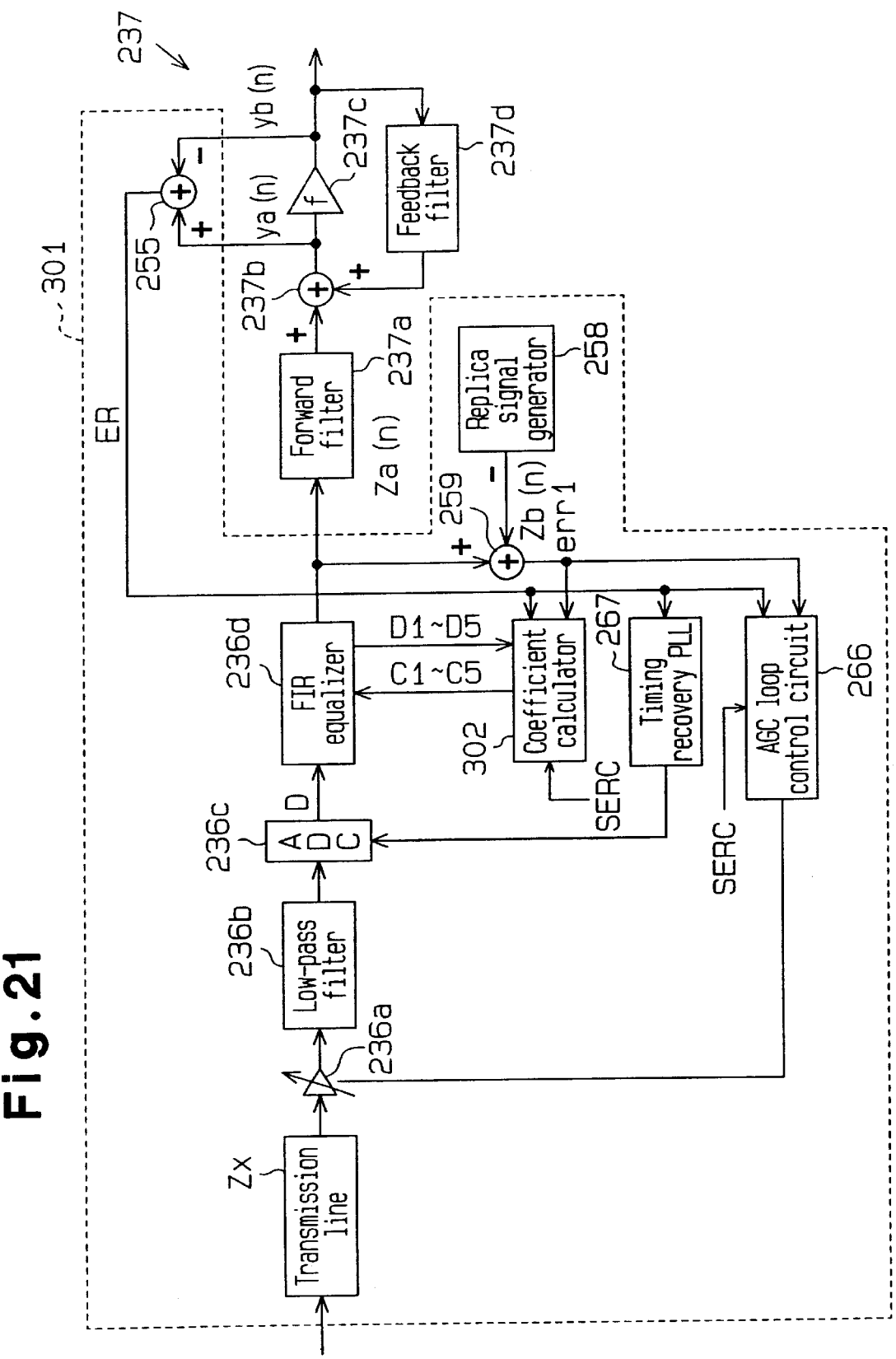
FIG. 21 is a schematic block diagram of a preprocessor and a DFE according to a fourth embodiment of the present invention.
Figure 22:
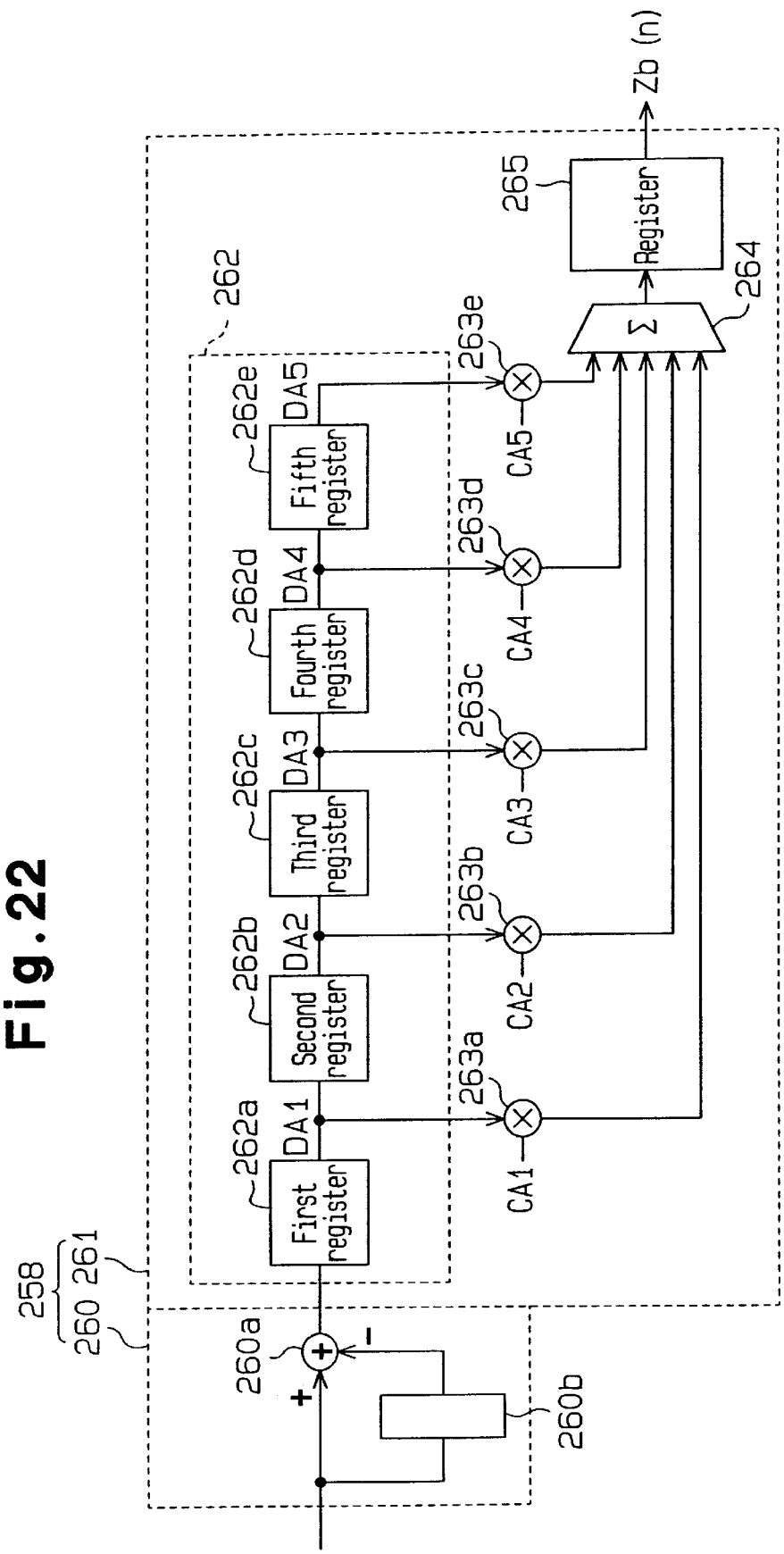
FIG. 22 is a schematic block diagram of a replica signal generator of the DFE of FIG. 21.

FIG. 21 is a schematic block diagram illustrating a preprocessor 301 and a DFE 237. The preprocessor 301 includes a replica signal generator 258 and an adder 259. The replica signal generator 258 includes a differential circuit 260 and an FIR filter 261, as shown in FIG. 22.

The differential circuit 260 includes an adder 260a and a register 260b which serves as a delay circuit. The read signal RD corresponding to periodic write data (preamble data) that has been produced by the MPU 17 is supplied to the adder 260a and the register 260b from the head unit 14, and is differentiated by the adder 260a and the register 260b.

The FIR filter 261 includes a shift register 262 comprised of five registers 262a to 262e corresponding to the number of taps of the FIR equalizer 236d, five multipliers 263a to 263e associated with the registers 262a–262e, an adder 264 and an output register 265.

The registers 262a–262e are connected in series, and each register samples the differentiated read signal in synchronism with the sampling clock SCK and supplies the sampled data to the next register as well as temporarily holds the sampled data.

Data DA1–DA5 stored in the registers 262a–262e are respectively supplied to the multipliers 263a–263e. The multipliers 263a–263e respectively receive the data DA1–DA5 and predetermined coefficients CA1–CA5 and respectively multiply the data DA1–DA5 by the predetermined coefficients CA1–CA5. The multipliers 263a–263e then supply the multiplication results to the adder 264. The coefficients CA1–CA5 are preset in such a manner that the read signal RD corresponding to the write data (preamble data) is equalized in accordance with a predetermined target characteristic.

The adder 264 adds the five operation results from the multipliers 263a–263e and supplies the addition result to the register 265. The addition result of the adder 264 is the digital signal that is acquired by equalizing the read signal RD corresponding to the write data (preamble data) according to the predetermined target characteristic.

The register 265 samples the addition result from the adder 264 in synchronism with the sampling clock SCK and supplies the sampled addition result as a replica signal Zb(n) to the adder 259. The replica signal Zb(n) is the signal that is generated when the DFE 237 equalizes the read signal RD corresponding to known write data with an ideal characteristic.

The adder 259 receives the replica signal Zb(n) from the replica signal generator 258 and the equalized digital signal Za(n) from the FIR equalizer 236d and produces an error signal err1 (Za(n)–Zb(n)). That is, the adder 259 computes an error having a value between the replica signal Zb(n) and the equalized digital signal Za(n) produced from the actual read signal RD by the FIR equalizer 236d.

The coefficient calculator 302 receives the error signal err1 from the adder 259 and the equalized error signal ER from the error-calculation adder 255, and selects either the error signal err1 or the equalized error signal ER in accordance with a switch control signal SERC from the MPU 17. The coefficient calculator 302 computes the individual coefficients C1–C5 of the FIR equalizer 236d according to the aforementioned correlation equations of the LMS algorithm using the selected error signal.

When the error signal err1 is selected, the coefficient calculator 302 computes the individual coefficients C1–C5 to minimize the mean square error between the equalized digital signal Za(n) from the FIR equalizer 236d and the replica signal Zb(n) from the replica signal generator 258.

When the error signal ER is selected, the coefficient calculator 302 computes the individual coefficients C1–C5 to minimize the mean square error between the added signal from the adder 237b in the DFE 237 and the decision signal from the decision circuit 237c.

When the HDC 19 starts operating and when an error occurs due to an increase in errors, the MPU 17 sets the switch control signal SERC to an H level in order to select the error signal err1. At this time, when the preamble data is read from the magnetic disk 13, the MPU 17 permits the head unit 14 to supply the read signal RD corresponding to the preamble data to the replica signal generator 258. The FIR equalizer 236d produces the equalized digital signal Za(n) from the read signal RD corresponding to the preamble data and produces the error signal err1 between the equalized digital signal Za(n) and the replica signal Zb(n). The coefficient calculator 302 computes the optimal coefficients C1–C5 using the error signal err1.

When the HDC 19 is in normal operation and when an error does not occur, the MPU 17 sets the switch control signal SERC to an L level in order to select the equalized error signal ER. At this time, the read signal RD for the preamble data is not supplied to the replica signal generator 258 from the head unit 14.

The preprocessor 236 includes an AGC loop control circuit 266 and a timing recovery PLL 267. The AGC loop control circuit 266 receives the equalized error signal ER and the error signal err1 and selects one of them in accordance with the switch control signal SERC from the MPU 17. Based on the selected error signal (amplitude error), the AGC loop control circuit 266 adjusts the gain of the AGC 236a in such a way that the output signal of the AGC 236a has the optimum amplitude.

When the error signal err1 is selected, the gain of the AGC 236a is adjusted based on the error signal err1. When the equalized error signal ER is selected, the gain of the AGC 236a is adjusted based on this equalized error signal ER.

The timing recovery PLL 267 receives the equalized error signal ER (phase error) based on which the timing recovery PLL 267 adjusts the frequency of the sampling clock SCK in such a way that the ADC 236c performs sampling at the optimal timing.

The signal processor according to the fourth embodiment has the following advantages.

(1) The replica signal generator 258 reproduces the equalized digital signal (replica signal Zb(n)) which has been produced from the read signal RD corresponding to the preamble data according to the ideal noise-free characteristic. That is, the replica signal generator 258 generates the ideal noise-free replica signal Zb(n) in synchronism with the equalized digital signal Za(n). When the FIR equalizer 236d actually produces the equalized digital signal Za(n) from the read signal RD corresponding to the preamble data read by the head unit 14, this equalized digital signal Za(n) may contain noise which is generated in the analog signal system due to use conditions, manufacturing variations and time-dependent changes.

The adder 259 produces the error signal err1 (Za(n)–Zb(n)) between the replica signal Zb(n) and the actual equalized digital signal Za(n) and the coefficient calculator 302 computes the optimal coefficients C1–C5 using the error signal err1. Accordingly, the level of the error corresponding to noise is acquired accurately. What is more, as the signals do not pass the DFE 237, the computation training time for the coefficients C1–C5 or the time for which the coefficients converge is relatively short.

(2) The gain of the AGC 236a is adjusted based on the error signal err1 (Za(n)–Zb(n)) and the time needed for the adjustment is relatively short as the signals do not pass through the DFE 237.

According to the fourth embodiment, the replica signal Zb(n) may be generated in accordance with the sync data instead of the preamble data. Alternatively, the replica signal Zb(n) may be generated in accordance with both the preamble data and the sync data.

The replica signal Zb(n) may be generated in accordance with an exclusive training pattern. In this case, the training pattern is pre-written on the magnetic disk 13. The replica signal generator 258 produces the replica signal Zb(n) from the read signal corresponding to the training pattern.

In the fourth embodiment, the coefficients C1–C5 may be calculated using only the error signal err1.

The computation of the coefficients C1–C5 may be carried out, for example, every time the preamble data is read.

It should be apparent to those skilled in the art that the present invention may be embodied in many other specific forms without departing from the spirit or scope of the invention. Particularly, it should be understood that the invention may be embodied in the following forms.

In the third and fourth embodiments, the coefficients C1–C5 of the FIR equalizer 236d may be fixed. In this case, it is preferable to conduct a test for setting the coefficients C1–C5 based on the equalized digital signal Za(n) that is free of noise which is produced in the analog signal system due to use conditions, manufacturing variations and time-dependent changes.

The third and fourth embodiments may further comprise a coefficient calculator for setting the coefficients of the forward filter 237a and feedback filter 237d of the DFE 237 by using the equalized error signal ER.

This invention may be embodied in a semiconductor device which comprises the DFE 237 having the FIR equalizer 236d.

The present invention can be adapted not only to a hard disk device but also to a base-band digital communication system having a DFE.

Therefore, the present examples and embodiments are to be considered as illustrative and not restrictive and the invention is not to be limited to the details given herein, but may be modified within the scope and equivalence of the appended claims.

What is claimed is:

1. A semiconductor circuit comprising:
   a decision feedback equalizer for waveform-equalizing a corrected input signal and generating a waveform-equalized signal, wherein the equalizer compares the waveform-equalized signal with a predetermined reference level to generate a decision signal having first and second decision values and an error signal between the waveform-equalized signal and the decision signal;
   a dispersion-value calculator, connected to the decision feedback equalizer, for calculating a first dispersion value of the decision signal having the first decision value and a second dispersion value of the decision signal having the second decision value using the error signal and producing a compensation signal using the first and second dispersion values; and
   an asymmetry compensator, connected to the decision feedback equalizer and the dispersion-value calculator, for receiving an input signal and correcting an asymmetry of the input signal in accordance with the compensation signal and supplying the corrected input signal to the decision feedback equalizer.

2. The semiconductor circuit according to claim 1, wherein the input signal has a predetermined amplitude range and the asymmetry compensator segments the predetermined amplitude range of the input signal into a plurality of sub-ranges and corrects the asymmetry of the input signal sub-range by sub-range in accordance with the compensation signal.

3. The semiconductor circuit according to claim 2, wherein the asymmetry compensator includes a plurality of sub-compensators, provided for the respective sub-ranges, for correcting the asymmetry of the input signal in the respective sub-ranges.

4. The semiconductor circuit according to claim 3, wherein each sub-compensator sets a compensation value for the input signal having a smaller amplitude than that of the next sub-range.

5. The semiconductor circuit according to claim 1, wherein the dispersion-value calculator includes:
   a square circuit for calculating a square of the error signal;
   a first dispersion-value calculator, connected to the square circuit, for calculating the first dispersion value by integrating the square and the first decision value of the decision signal;
   a second dispersion-value calculator, connected to the square circuit, for calculating the second dispersion value by integrating the square and the second decision value of the decision signal; and
   a calculation circuit, connected to the first and second dispersion-value calculators, for computing the compensation signal as the difference between the first dispersion value and the second dispersion value.

6. The semiconductor circuit according to claim 1, further comprising:
   an auto gain control (AGC) loop for receiving the input signal and generating an input signal having an optimal gain using the error signal, wherein asymmetry compensator receives the input signal having the optimal gain as its input signal; and
   a phased locked loop (PLL) for generating a sampling clock using the error signal, wherein the decision feedback equalizer samples the decision signal in accordance with the sampling clock.

7. The semiconductor circuit according to claim 6, wherein operations of the AGC loop and the PLL are held while the dispersion-value calculator is generating the compensation signal.

8. The semiconductor circuit according to claim 6, wherein when the dispersion-value calculator is generating the compensation signal, an operation of the AGC loop is controlled to decrease a change in gain of the input signal and an operation of the PLL is controlled to decrease a change in frequency of the sampling clock.

9. The semiconductor circuit according to claim 6, wherein the input signal includes a first pattern data signal suitable for operations of the AGC loop and the PLL and a second pattern data signal suitable for operations of the dispersion-value calculator.

10. The semiconductor circuit according to claim 9, wherein the first pattern data signal includes a periodic pattern data signal and the second pattern data signal includes a random pattern data signal.

11. A semiconductor circuit comprising:
    an analog-to-digital (A/ID) converter for converting an analog input signal to a digital input signal with an intermediate reference voltage as a base line;
    a decision feedback equalizer for waveform-equalizing a corrected digital input signal and generating a waveform-equalized signal, wherein the equalizer compares the waveform-equalized signal with a predetermined reference level and produces a decision signal having first and second decision values and an error signal between the waveform-equalized signal and the decision signal;
    a dispersion-value calculator, connected to the decision feedback equalizer, for calculating a first dispersion value of the decision signal having the first decision value and a second dispersion value of the decision signal having the second decision value using the error signal and producing a compensation signal using the first and second dispersion values;

an asymmetry compensator, connected between the decision feedback equalizer and the AID converter, for receiving the compensation signal from the dispersion-value calculator, correcting an asymmetry of the digital input signal using the compensation signal and supplying the corrected digital input signal to the decision feedback equalizer;

a baseline compensation detector, connected to the decision feedback equalizer, for computing a base-line compensation value using the waveform-equalized signal; and a digital-to-analog (D/A) converter, connected to the base-line compensation detector and the AID converter, for producing the intermediate reference voltage in accordance with the base-line compensation value and supplying the intermediate reference voltage to the AID converter.

12. The semiconductor circuit according to claim 11, wherein the base-line compensation detector includes:

a counter for counting a sampling clock when the waveform-equalized signal lies in a predetermined level range around the predetermined reference level; and a calculation circuit for calculating the base-line compensation value based on a count value of the counter.

13. A semiconductor device comprising:

a decision feedback equalizer for waveform-equalizing a corrected input signal and generating a waveform-equalized signal, wherein the equalizer compares the waveform-equalized signal with a predetermined reference level to generate a decision signal having first and second decision values and an error signal between the waveform-equalized signal and the decision signal;

a dispersion-value calculator, connected to the decision feedback equalizer, for calculating a first dispersion value of the decision signal having the first decision value and a second dispersion value of the decision signal having the second decision value using the error signal and producing a compensation signal using the first and second dispersion values; and an asymmetry compensator, connected to the decision feedback equalizer and the dispersion-value calculator, for receiving an input signal and correcting an asymmetry of the input signal in accordance with the compensation signal and supplying the corrected input signal to the decision feedback equalizer.

14. A semiconductor device comprising:

an analog-to-digital (AID) converter for converting an analog input signal to a digital input signal with an intermediate reference voltage as a base line;

a decision feedback equalizer for waveform-equalizing a corrected digital input signal and generating a waveform-equalized signal, wherein the equalizer compares the waveform-equalized signal with a predetermined reference level and produces a decision signal having first and second decision values and an error signal between the waveform-equalized signal and the decision signal;

a dispersion-value calculator, connected to the decision feedback equalizer, for calculating a first dispersion value of the decision signal having the first decision value and a second dispersion value of the decision signal having the second decision value using the error signal and producing a compensation signal using the first and second dispersion values;

an asymmetry compensator, connected between the decision feedback equalizer and the AID converter, for receiving the compensation signal from the dispersion-value calculator, correcting an asymmetry of the digital input signal using the compensation signal and supplying the corrected digital input signal to the decision feedback equalizer;

a base-line compensation detector, connected to the decision feedback equalizer, for computing a base-line compensation value using the waveform-equalized signal;

and a digital-to-analog (D/A) converter, connected to the base-line compensation detector and the AID converter, for producing the intermediate reference voltage in accordance with the baseline compensation value and supplying the intermediate reference voltage to the AID converter.

* * * * *

UNITED STATES PATENT AND TRADEMARK OFFICE
CERTIFICATE OF CORRECTION

PATENT NO. : 6,798,832 B1
DATED : September 28, 2004
INVENTOR(S) : Yoshitaka Nakata It is certified that error appears in the above-identified patent and that said Letters Patent is hereby corrected as shown below:

Column 22,
Line 55, delete "(A/ID)" and insert -- (A/D) --.

Signed and Sealed this

First Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,798,832 B1
DATED : September 28, 2004
INVENTOR(S) : Yoshitaka Nakata It is certified that error appears in the above-identified patent and that said Letters Patent is hereby corrected as shown below:

Column 23,
Lines 7, 18 and 21, delete "AID" and insert -- A/D --.

Column 24,
Line 8, delete "(AID)" and insert -- (A/D) --.
Lines 29, 40 and 43, delete "AID" and insert -- A/D --.

Signed and Sealed this

Twenty-first Day of February, 2006

JON W. DUDAS
*Director of the United States Patent and Trademark Office*